US007245872B2

(12) United States Patent
Hirai

(10) Patent No.: US 7,245,872 B2

(45) Date of Patent: Jul. 17, 2007

(54) SATELLITE BROADCASTING CONVERTER, CONTROL CIRCUIT INCORPORATED THEREIN, AND DETECTOR CIRCUIT USED IN SUCH CONTROL CIRCUIT

(75) Inventor: Masato Hirai, Kanagawa (JP)

(73) Assignee: NEC Electronics Corporation, Kawasaki, Kanagawa (JP)

(*) Notice: Subject to any disclaimer, the term of this patent is extended or adjusted under 35 U.S.C. 154(b) by 224 days.

(21) Appl. No.: 11/139,560

(22) Filed: May 31, 2005

(65) Prior Publication Data

US 2005/0266794 A1 Dec. 1, 2005

(30) Foreign Application Priority Data

Jun. 1, 2004 (JP) ............................. 2004-163764

(51) Int. Cl.
*H04B 1/16* (2006.01)
*H04H 1/00* (2006.01)

(52) U.S. Cl. ............... 455/3.02; 455/188.1; 455/190.1; 455/315; 455/323

(58) Field of Classification Search ............... 455/3.02, 455/132, 140, 141, 150.1, 180.1, 183.1–183.2, 455/188.1, 323, 189.1, 334, 190.1, 191.1, 455/196.1, 197.1–197.3, 208–209, 214, 255–266, 455/313–315, 318–320, 343.1
See application file for complete search history.

(56) References Cited

U.S. PATENT DOCUMENTS

| | | | | |
|---|---|---|---|---|
| 5,649,311 | A | 7/1997 | Somei | 455/188.1 |
| 6,957,039 | B2 * | 10/2005 | Imai | 455/3.02 |
| 7,142,808 | B2 * | 11/2006 | Atarashi | 455/3.02 |
| 2005/0164629 | A1 * | 7/2005 | Hirai | 455/3.02 |
| 2006/0009151 | A1 * | 1/2006 | Hirai | 455/3.02 |

FOREIGN PATENT DOCUMENTS

| | | |
|---|---|---|
| JP | 64-21535 | 2/1989 |
| JP | 4-135328 | 5/1992 |
| JP | 8-293812 | 11/1996 |
| JP | 10-233708 | 9/1998 |

OTHER PUBLICATIONS

Copending U.S. Appl. No. 11/174,739, to Masato Hirai filed on Jul. 6, 2005.

Copending U.S. Appl. No. 11/1043,152 to Masato Hirai filed on Jan. 27, 2005.

Japanese Office Action dated May 22, 2006, with partial English-Language translation.

* cited by examiner

*Primary Examiner*—Philip J. Sobutka
(74) *Attorney, Agent, or Firm*—McGinn IP Law Group, PLLC

(57) ABSTRACT

In a broadcasting satellite converter adapted to be connected to a BS tuner and fed with a power supply voltage signal from the broadcasting satellite tuner, a receiver circuit is controlled by a control circuit. The broadcasting satellite converter comprises a receiver circuit including a mixer, and a plurality of local oscillators connected to the mixer to convert broadcasting satellite signals into intermediate frequency signals, and a control circuit that controls the receiver circuit. The control circuit includes a detector circuit that detects whether a band switching pulse signal is superimposed on the pulse signal, the detector circuit including a converting circuit that converts a frequency of the band switching pulse signal into an integrated value for the detection of the band switching pulse signal. The control circuit further includes a selector circuit that selectively drives one of the local oscillators in accordance with the integrated value obtained in the detector circuit.

7 Claims, 14 Drawing Sheets

TIME

TIME

VH
VL
TIME

THO
TIME

TIME

Fig. 8
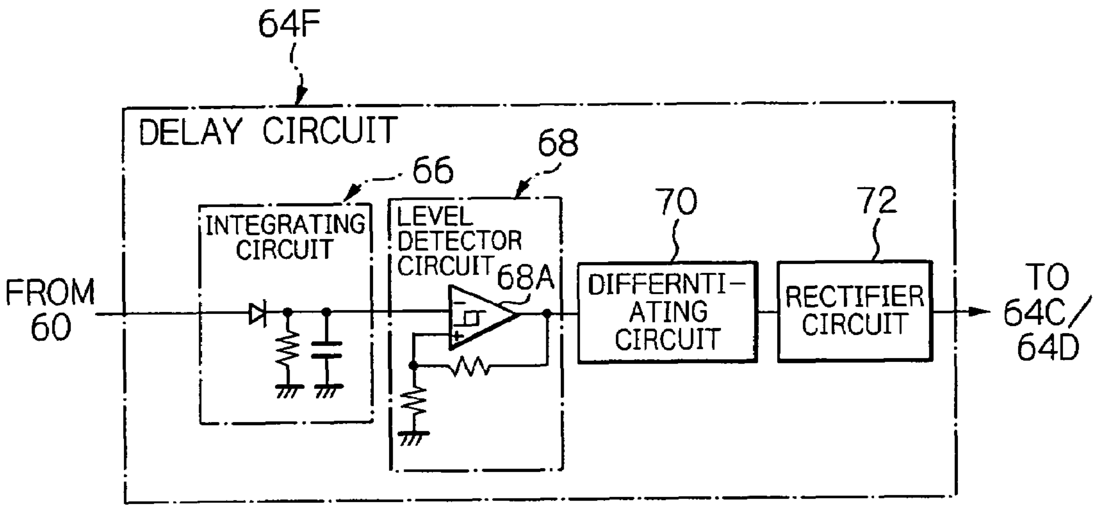
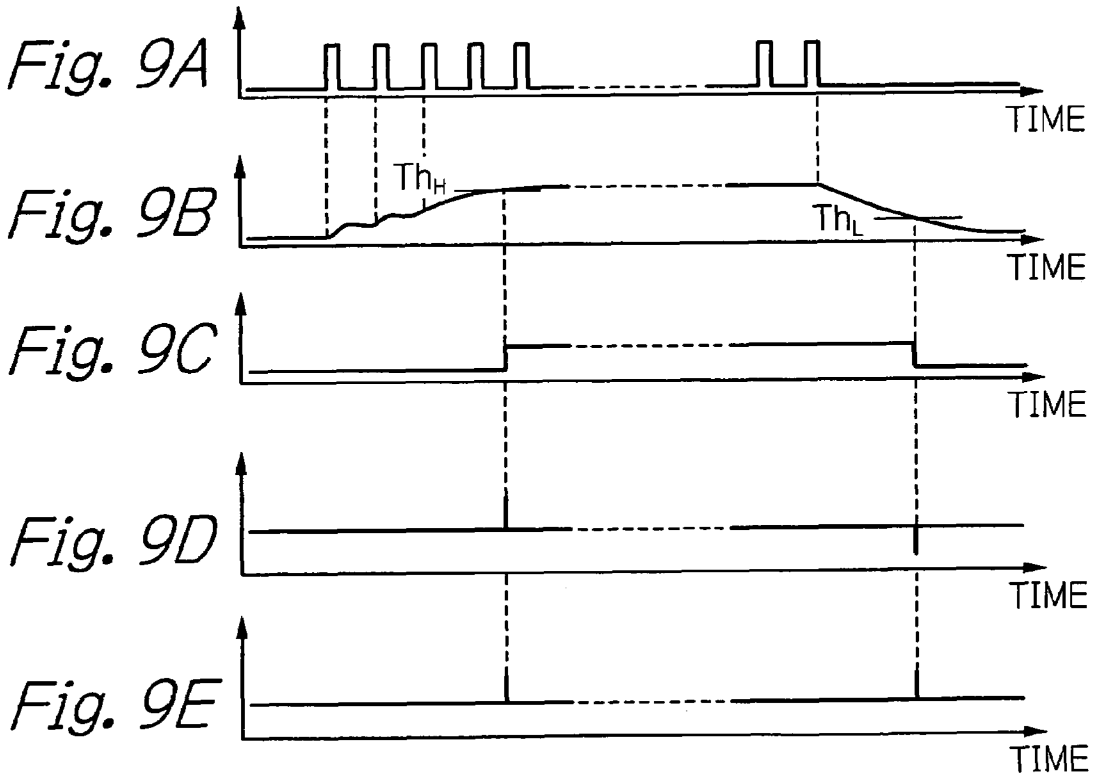

SATELLITE BROADCASTING CONVERTER, CONTROL CIRCUIT INCORPORATED THEREIN, AND DETECTOR CIRCUIT USED IN SUCH CONTROL CIRCUIT

BACKGROUND OF THE INVENTION

1. Field of the Invention

The present invention relates to a converter, called a broadcasting satellite (BS) converter in this field, which is used to receive BS signals in a satellite broadcasting system, and more particularly relates to an improvement of a control circuit incorporated in the BS converter to select either a high frequency band or a low frequency band included in a reception frequency band used in the satellite broadcasting system.

2. Description of the Related Art

A reception system of a satellite broadcasting system includes a low noise down converter block (LNB) provided in a parabola antenna, and a set top box (STB) connected to the LNB through the intermediary of a coaxial cable. In this specification, the LNB will be referred to as a broadcasting satellite (BS) converter, and the STB will be referred to as a broadcasting satellite (BS) tuner.

In recent years, a reception frequency band used in the satellite broadcasting system has been widened to accommodate digitization of the satellite broadcasting system and an increase in the number of channels thereof. For example, the widened reception frequency band is defined as one between 10.7 GHz and 12.75 GHz, and it is impossible to receive all broadcasting satellite (BS) signals (microwaves), included in the widened reception frequency band, with only one parabola antenna and one BS converter. In other words, it is necessary to prepare two parabola antennas and two BS converters before all the BS signals can be received and processed. Namely, the reception frequency band is divided into a low frequency band of 10.7 GHz to 11.7 GHz and a high frequency band of 11.7 GHz to 12.75 GHz, and the two parabola antennas and two BS converters are arranged for receiving and processing the respective low and high frequency bands.

JP-A-H08-293812, corresponding to U.S. Pat. No. 5,649,311, discloses a prior art BS converter which is constituted so as to receive and process all the BS signals included in the reception frequency band. Namely, according to JP-A-H08-293812, it is possible to receive and process all the BS signals with a single parabola antenna and BS converter.

This prior art BS converter is provided with a reception circuit for receiving and processing all the BS signals, and a control circuit for controlling the reception circuit. The reception circuit includes a mixer, and first and second local oscillators connected to the mixer. The first local oscillator inputs a first local frequency signal to the mixer, and the second local oscillator inputs a second local frequency signal to the mixer. The first local frequency signal features a lower frequency than that of the second local frequency signal. The control circuit selects which local oscillator should be driven.

In particular, when a television set, which is connected to the BS converter through the intermediary of the BS tuner and the coaxial cable, is tuned to a channel to receive a BS signal included in the low frequency band of 10.7 GHz to 11.7 GHz, only the first local oscillator is driven by the control circuit so that the BS signals included in the low frequency band of 10.7 GHz to 11.7 GHz are converted into intermediate frequency signals featuring a frequency of 950 MHz to 2150 MHz.

On the other hand, when the television set is tuned to a channel to receive a BS signal included in the high frequency band of 11.7 GHz to 12.75 GHz, only the second local oscillator is driven by the control circuit so that the BS signals included in the high frequency band of 11.7 GHz to 12.75 GHz are converted into intermediate frequency signals featuring a frequency of 950 MHz to 2150 MHz.

Thus, by using the prior art BS converter, it is possible to receive and process all the BS signals by the single parabola antenna and BS converter. Nevertheless, the prior art BS converter is not satisfactory in that it is impossible to obtain reliable operation.

In particular, when the television set is tuned to a channel to receive a BS signal included in the high frequency band of 11.7 GHz to 12.75 GHz, a band switching pulse signal is superimposed on a power supply voltage signal which is fed from the BS tuner to the BS converter through the coaxial cable. The control circuit includes a detector circuit for detecting whether the band switching pulse signal is superimposed on the power supply voltage signal, and a selector circuit for selectively driving the second local oscillator when the band switching pulse signal is detected by the detector circuit.

However, in this prior art, the detector circuit is susceptible to large amplitude noise, such as a spike noise or the like. As a result, a malfunction of the detector circuit may occur. Namely, the control circuit may mistakenly select which local oscillator should be driven, as explained in detail hereinafter.

SUMMARY OF THE INVENTION

Therefore, an object of the present invention is to provide a broadcasting satellite (BS) converter used to receive and process BS signals in a satellite broadcasting system, which is constituted such that it is possible to obtain a satisfactorily reliable operation.

Another object of the present invention is to provide a control circuit that controls a receiver circuit included in such a BS converter.

Yet another object of the present invention is to provide a detector circuit used in such a control circuit, which is not susceptible to various noises.

In accordance with a first aspect of the present invention, there is provided a broadcasting satellite converter adapted to be connected to a broadcasting satellite tuner and fed with a pulse signal from the broadcasting satellite tuner. The broadcasting satellite converter comprises a receiver circuit including a mixer, and a plurality of local oscillators connected to the mixer to convert broadcasting satellite signals into intermediate frequency signals, and a control circuit that controls the receiver circuit. The control circuit includes a detector circuit that detects whether a band switching pulse signal is superimposed on the pulse signal, and the detector circuit includes a converting circuit that converts a frequency of the band switching pulse signal into an integrated value for the detection of the band switching pulse signal. The control circuit further includes a selector circuit that selectively drives one of the local oscillators in accordance with the integrated value obtained in the detector circuit.

In accordance with a second aspect to the present invention, there is provided a control circuit that controls a plurality of local oscillators, included in a receiver circuit of a broadcasting satellite converter, with a band switching pulse signal superimposed on a pulse signal fed from a broadcasting satellite tuner to the receiver circuit. The control circuit comprises a detector circuit that detects whether the band switching pulse signal is superimposed on the pulse signal, and the detector circuit includes a converting circuit that converts a frequency of the band switching pulse signal into an integrated value for the detection of the band switching pulse signal. The control circuit further includes a selector circuit that selectively drives one of the local oscillators in accordance with the integrated value obtained in the detector circuit.

The converting circuit may be formed as a frequency-to-voltage converting circuit including a monostable multivibrator to produces a series of pulses having a given constant pulse width based on the frequency of the band switching pulse signal, and an integrating circuit that integrates the series of pulses to thereby produce the integrated value as a voltage signal.

Alternatively, the converting circuit may be formed as a digital converting circuit including a monostable multivibrator to produces a series of pulses having a given constant pulse width based on the frequency of the band switching pulse signal, and an up-down counter that digitally integrates the series of pulses to thereby produce the integrated value as count number data.

The detector circuit may further include a high pass filter that is constituted such that the band switching pulse signal is allowed to pass therethrough, and a level detector circuit that detects a peak voltage of the band switching pulse signal so as to wave-shape the band switching pulse signal. In this case, the conversion of the frequency of the band switching pulse signal to the integrated value by the converting circuit is carried out based on the wave-shaped band switching pulse signal. Preferably, the level detector circuit includes a comparator featuring a hysteresis characteristic for the wave-shaping of the band switching pulse signal.

The detector circuit may further include a comparator circuit that compares the integrated value with a reference value for the detection of the band switching pulse signal.

Preferably, the comparator circuit is formed as a window-type comparator circuit that compares the integrated value with a first reference value and a second reference value, the detection of the band switching pulse signal being recognized when the integrated value falls within a range between the first and second reference values. The comparator circuit may include a delay circuit that delays the comparison of the integrated value with the reference voltage until the integrated value becomes steady.

In accordance with a third aspect of the present invention, there is provided a detector circuit that detects whether a band switching pulse signal is superimposed on a pulse signal fed from a broadcasting satellite tuner to a receiver circuit of a broadcasting satellite converter. The detector circuit comprises an integrating circuit that integrates the band switching pulse signal to thereby produce an integrated value for the detection of the band switching pulse signal.

The integrating circuit may be formed as an analog integrating circuit which produces a voltage signal as the integrated value. In this case, the analog integrating circuit may comprise either an RC integrating circuit or a constant-current type charging/discharging circuit.

The detector circuit may further comprises a high pass filter that is constituted such that the band switching pulse signal is allowed to pass therethrough, a level detector circuit that detects a peak voltage of the band switching pulse signal so as to wave-shape the band switching pulse signal, and an analog monostable multivibrator that produces a series of pulses having a given constant pulse width based on the wave-shaped band switching pulse signal, the series of pulses being input to the integrating circuit. Preferably, the level detector circuit includes a comparator featuring a hysteresis characteristic for the wave-shaping of the band switching pulse signal.

The detector circuit may further comprises an analog comparator circuit that compares the voltage signal with a reference voltage for the detection of the band switching pulse signal. Preferably, the analog comparator circuit is formed as a window-type comparator circuit that compares the voltage signal with a first reference voltage and a second reference voltage, the detection of the band switching pulse signal being recognized when the voltage signal falls within a range between the first and second reference voltages. The analog comparator circuit may further include a delay circuit that delays the comparison of the voltage signal with the reference voltage until the voltage signal becomes steady.

The integrating circuit may be formed as a digital integrating circuit, which produces count number data as the integrated value. In this case, the detector circuit further comprises a high pass filter that is constituted such that the band switching pulse signal is allowed to pass therethrough, a level detector circuit that detects a peak voltage of the band switching pulse signal so as to wave-shape the band switching pulse signal, and a digital monostable multivibrator that produces a series of pulses having a given constant pulse width based on the wave-shaped band switching pulse signal, the series of pulses being input to the digital integrating circuit. Preferably, the level detector circuit includes a comparator featuring a hysteresis characteristic for the wave-shaping of the band switching pulse signal.

The detector circuit may further comprises a digital comparator circuit that compares the count number data with a reference number data for the detection of the band switching pulse signal. Preferably, the digital comparator circuit is formed as a window-type comparator circuit that compares the count number data with a first reference number data and a second count number data, the detection of the band switching pulse signal being recognized when the count number data falls within a range between the first and second reference number data. The digital comparator circuit may include a delay circuit that delays the comparison of the count number data with the reference number data until the voltage signal becomes steady.

BRIEF DESCRIPTION OF THE DRAWINGS

The above object and other objects will be more clearly understood from the description set forth below, with reference to the accompanying drawings, wherein:

FIG. 8 is a circuit diagram of the delay circuit shown in FIG. 4;

FIG. 9A is a timing chart showing a series of pulses output from the one shot multivibrator when the band switching pulse signal is input to the detector circuit according to the present;

FIG. 9B is a timing chart to explain an operation of an integrating circuit shown in FIG. 8, when the band switching pulse signal is input to the detector circuit according to the present invention;

FIG. 9C is a timing chart to explain an operation of a level detector circuit shown in FIG. 8, when the band switching pulse signal is input to the detector circuit according to the present invention;

FIG. 9D is a timing chart to explain an operation of a differentiating circuit shown in FIG. 8, when the band switching pulse signal is input to the detector circuit according to the present invention;

FIG. 9E is a timing chart to explain an operation of a rectifier circuit shown in FIG. 8, when the band switching pulse signal is input to the detector circuit according to the present invention;

DESCRIPTION OF THE PREFERRED EMBODIMENTS

Figure 1:
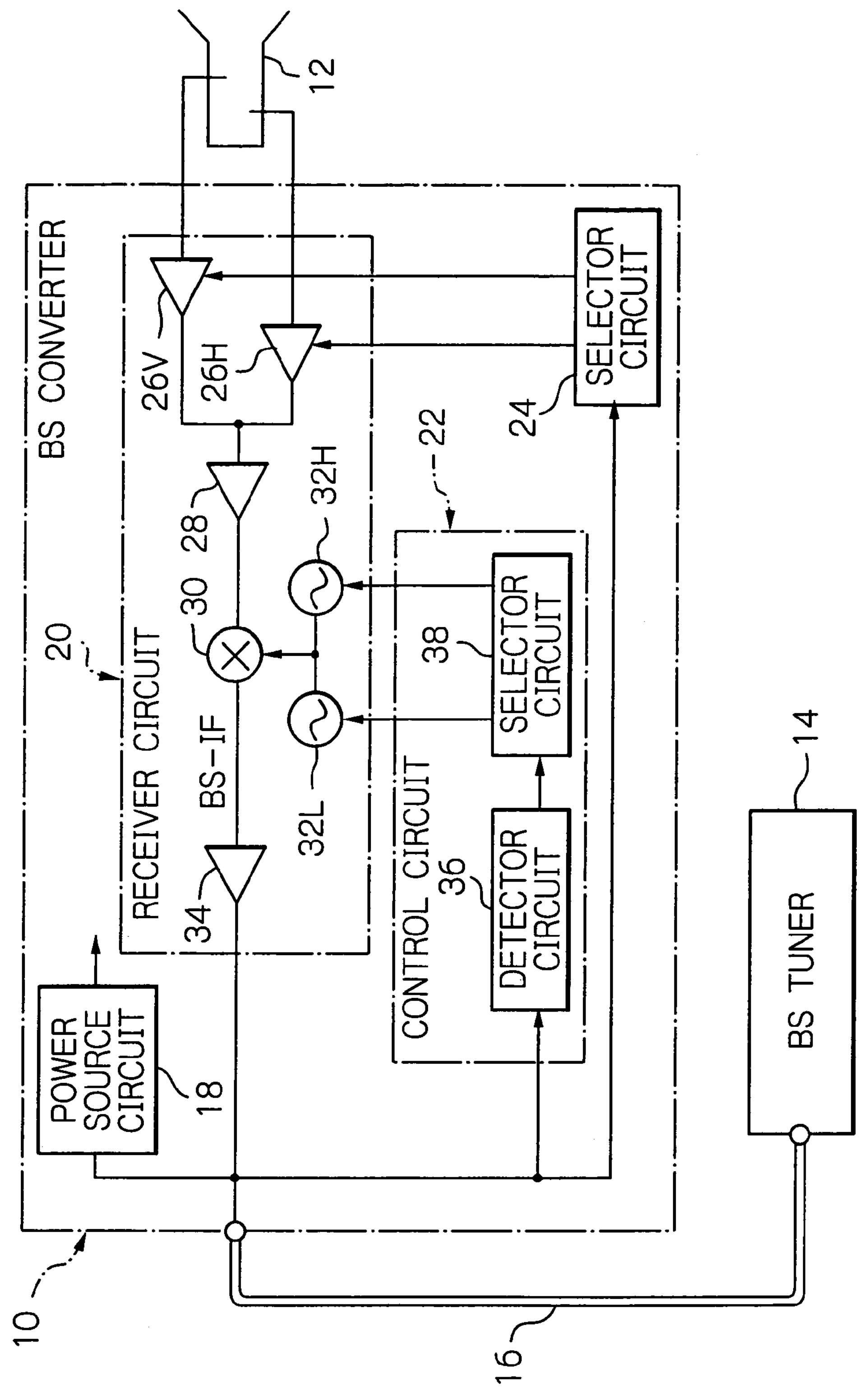
Fig. 1 PRIOR ART
FIG. 1 is a block diagram of a prior art broadcasting satellite converter.

Before description of an embodiment of the present invention, for better understanding of the present invention, a prior art broadcasting satellite (BS) converter, as disclosed in JP-A-H08-293812, will be now explained with reference to FIGS. 1 and 2.

This prior art BS converter, generally indicated by reference 10, is provided with a feed horn 12 associated with an exterior parabola antenna (not shown), and is connected to an interior broadcasting satellite (BS) tuner 14 through a coaxial cable 16.

The BS converter 10 comprises a power source circuit 18, a receiver circuit 20, a control circuit 22, and a selector circuit 24. In operation, a power supply voltage signal is fed from the BS tuner 14 to the BS converter 10 through the coaxial cable 16, and is input to the power source circuit 18 and the selector circuit 24. Although the power supply voltage signal is switched between a low voltage (e.g. 13 volts) and a high voltage (e.g. 18 volts) for the reasons stated in detail hereinafter, the power source circuit 18 always generates a constant power supply voltage (e.g. 4 volts) for operating the receiver circuit 20, the control circuit 22, and the selector circuit 24.

As shown in FIG. 1, the receiver circuit 20 includes a set of first and second primary amplifiers 26V and 26H, a secondary amplifier 28, a mixer 30, a set of first and second local oscillators 32L and 32H, and an amplifier 34.

Broadcasting satellite (BS) signals (microwaves), which are transmitted from a satellite, are converged on the feed horn 12 by the parabola antenna, and each of the BS signals is separated into a vertically polarized wave and a horizontally polarized wave. The vertically-polarized waves are fed to the first primary amplifier 26V, and are amplified and output to the secondary amplifier 28 as BS signals featuring the vertical polarization. On the other hand, the horizontally-polarized waves are fed to the second primary amplifier 26H, and are amplified and output to the secondary amplifier 28 as BS signals featuring the horizontal polarization. Note, as already stated above, the BS signals are included in a widened reception frequency band which is defined as one between 10.7 GHz and 12.75 GHz.

In operation, only one of the first and second primary amplifiers 26V and 26H is driven, and the selector circuit 24 selects which primary amplifier 26V or 26H should be driven.

In particular, for example, while a television set (not shown), connected to the BS tuner 14, is tuned to a channel to receive a BS signal featuring the vertical polarization, the power supply voltage signal, input to the selector switch 24, is switched from the high voltage (18 volts) to the low voltage (13 volts). At this time, a first drive control signal, which is output from the selector circuit 24 to the first primary amplifier 26V, is maintained at a high level so that the first primary amplifier 26V is driven. On the other hand, a second drive control signal, which is output from the selector circuit 24 to the second primary amplifier 26H, is maintained at a low level so that the second primary amplifier 26H is not driven. Namely, when the power supply voltage signal is switched from the high voltage (18 volts) to the low voltage (13 volts), only the first primary amplifier 26V is driven by the selector circuit 24.

When the television set, connected to the BS tuner 14, is tuned to a channel to receive a BS signal featuring the horizontal polarization, the power supply voltage signal, input to the selector switch 24, is switched from the low voltage (13 volts) to the high voltage (18 volts). At this time, the first drive control signal, which is output from the selector circuit 24 to the first primary amplifier 26V, is changed from the high level to a low level so that the driving of the first primary amplifier 26V is stopped. On the other hand, the second drive control signal, which is output from the selector circuit 24 to the second primary amplifier 26H, is changed from the low level to a high level so that the second primary amplifier 16H is driven. Namely, when the power supply voltage is switched from the low voltage (13 volts) to the high voltage (18 volts), only the second primary amplifier 26H is driven the selector circuit 24.

In short, the power supply voltage signal, which is switched between the low voltage (13 volts) and the high voltage (18 volts), serves as a pulse signal for selecting which primary amplifier 26V or 26H should be driven.

Either the BS signals featuring the vertical polarization or the BS signals featuring the horizontal polarization are fed to the secondary amplifier 28, and then the amplified BS signals are fed to the mixer 20 in which the BS signals are mixed with one of a first local frequency signal and a second local frequency signal which are output from the respective first and second local oscillators 32L and 32H. The first local frequency signal has a lower frequency than that of the second local frequency signal. When the BS signals are mixed with the first local frequency signal output from the first local oscillator 32L, a part of the BS signals, which are included in a low frequency band of 10.7 GHz to 11.7 GHz, are converted into intermediate frequency signals BS-IF (FIG. 1). When the BS signals are mixed with the second local frequency signal output from the second local oscillator 32H, the remaining part of the BS signals, which are included in a high frequency band of 11.7 GHz to 12.75 GHz, are converted into intermediate frequency signals BS-IF (FIG. 1).

In either event, the intermediate frequency signals BS-IF are fed from the mixer 10 to the amplifier 34, and the amplified intermediate frequency signals BS-IF are fed to the BS tuner 14 through the coaxial cable 16. Note, for example, the intermediate frequency signals BS-IF has a frequency of 1 GHz.

The control circuit 22 selects which local oscillator 32L or 32H should be driven. As shown in FIG. 1, the control circuit 22 includes a detector circuit 36 for detecting whether a band switching pulse signal is superimposed on the power supply voltage signal (13 volts or 18 volts), and a selector circuit 38 for selecting which local amplifier 32L or 32H should be driven on the basis of a detection result obtained in the detector circuit 36. Note, the band switching pulse signal is defined as a tone signal having a frequency of 22±4 kHz.

In particular, when the television set, connected to the BS tuner 14, is tuned to a channel to receive a BS signal included in the low frequency band of 10.7 GHz to 11.7 GHz, the band switching pulse signal is not superimposed on the power supply voltage signal (13 volts or 18 volts) in the BS tuner 14, and thus the band switching pulse signal cannot be detected by the detector circuit 36. At this time, a first drive control signal, which is output from the selector circuit 38 to the first local frequency oscillator 32L, is maintained at a high level so that the first local frequency oscillator 32L is driven. On the other hand, a second drive control signal, which is output from the selector circuit 38 to the second local frequency oscillator 32H, is maintained at a low level so that the second local frequency oscillator 32H is not driven.

In short, while the band switching pulse signal is not superimposed on the power supply voltage signal (13 volts or 18 volts), only the first local frequency oscillator 32L is driven so that the BS signals, included in the low frequency band of 10.7 GHz to 11.7 GHz, are converted into the intermediate frequency signals BS-IF.

When the television set, connected to the BS tuner 14, is tuned to a channel to receive a BS signal included in the high frequency band of 11.7 GHz to 12.75 GHz, the band switching pulse signal is superimposed on the power supply voltage signal (13 volts or 18 volts) in the BS tuner 14, and thus the band switching pulse signal can be detected by the detector circuit 36. At this time, the first drive control signal, which is output from the selector circuit 38 to the first local frequency oscillator 32L, is changed from the high level to a low level so that the driving of the first local frequency oscillator 32L is stopped. On the other hand, the second drive control signal, which is output from the selector circuit 38 to the second local frequency oscillator 32H, is changed from the low level to a high level so that the second local frequency oscillator 32H is driven.

In short, while the band switching pulse signal is superimposed on the power supply voltage signal (13 volts or 18 volts), only the second local frequency oscillator 32H is driven so that the BS signals, included in the high frequency band of 11.7 GHz to 12.75 GHz, are converted into the intermediate frequency signals BS-IF.

Figure 2:
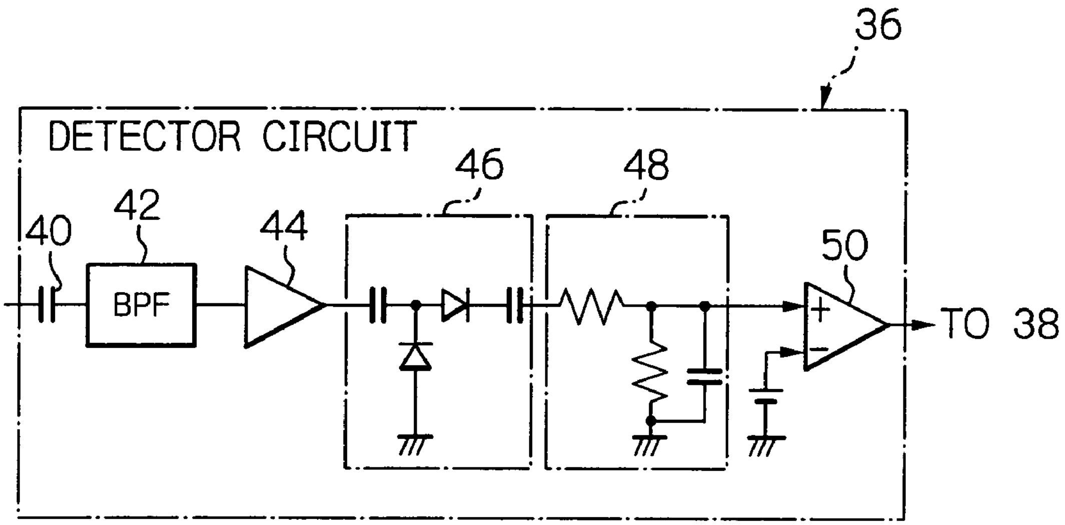
Fig. 2 PRIOR ART
FIG. 2 is a circuit diagram of a prior art detector circuit used in the prior art broadcasting satellite converter shown in FIG. 1.

FIG. 2 shows a circuit diagram of the detector circuit 36. As shown in this drawing, the detector circuit 36 includes a capacitor 40, a band pass filter 42, an amplifier 44, a rectifier circuit 46, a low pass filter 48, and a comparator 50.

For example, when the band switching pulse signal having the frequency of 22±4 kHz is superimposed on the power supply voltage signal (13 volts or 18 volts) in the BS tuner 14 by tuning the television set to a channel to receive a BS signal included in the high frequency band of 11.7 GHz to 12.75 GHz, the band switching pulse signal is input together with the intermediate frequency signals BS-IF to the band pass filter 42 through the capacitor 40, but only the band switching pulse signal is allowed to pass through the band pass filter 42. Then, the band switching pulse signal is input to the amplifier 44 so as to be amplified to a given voltage level.

The amplified band switching pulse signal is rectified by the rectifier circuit 46, and then an amplitude of the rectified band switching pulse signal is detected by the low pass filter 48. Namely, both the rectifier circuit 46 and the low pass filter 48 function as an amplitude detector for detecting the amplitude of the band switching pulse signal, so that the detected amplitude is output as an amplitude voltage signal from the low pass filter 48 to the comparator 50.

In the comparator 50, the amplitude voltage signal is compared with a predetermined reference voltage. The amplitude voltage signal, derived from the band switching pulse signal, is higher than the reference voltage of the comparator 50, so that a high level signal is output from the comparator 50 to the selector circuit 38. At this time, the drive control signal, which is output from the selector circuit 38 to the second local oscillator 32H, is changed from the low level to the high level, whereas the drive control signal, which is output from the selector circuit 38 to the first local oscillator 32L, is changed from the high level to the low level.

Thus, as stated above, only the second local oscillator 32H is driven so that the conversion of the BS signals, included in the high frequency band of 11.7 GHz to 12.75 GHz, into the intermediate frequency signals BS-IF is carried out.

Of course, when the band switching pulse signal having the frequency of 22±4 kHz is not superimposed on the power supply voltage signal (13 volts or 18 volts), i.e. when the television set is tuned to a channel to receive a BS signal included in the low frequency band of 10.7 GHz to 11.7 GHz, the amplitude voltage signal, which is output from the low pass filter 48, is lower than the reference voltage of the comparator 50, so that a low level signal is output from the comparator 50 to the selector circuit 38. At this time, the drive control signal, which is output from the selector circuit 38 to the first local oscillator 32L, is changed from the low level to the high level, whereas the drive control signal, which is output from the selector circuit 38 to the second local oscillator 32H, is changed from the high level to the low level.

Thus, as stated above, only the first local oscillator 32L is driven so that the conversion of the BS signals, included in the low frequency band of 10.7 GHz to 11.7 GHz, into the intermediate frequency signals BS-IF is carried out.

Figure 3:
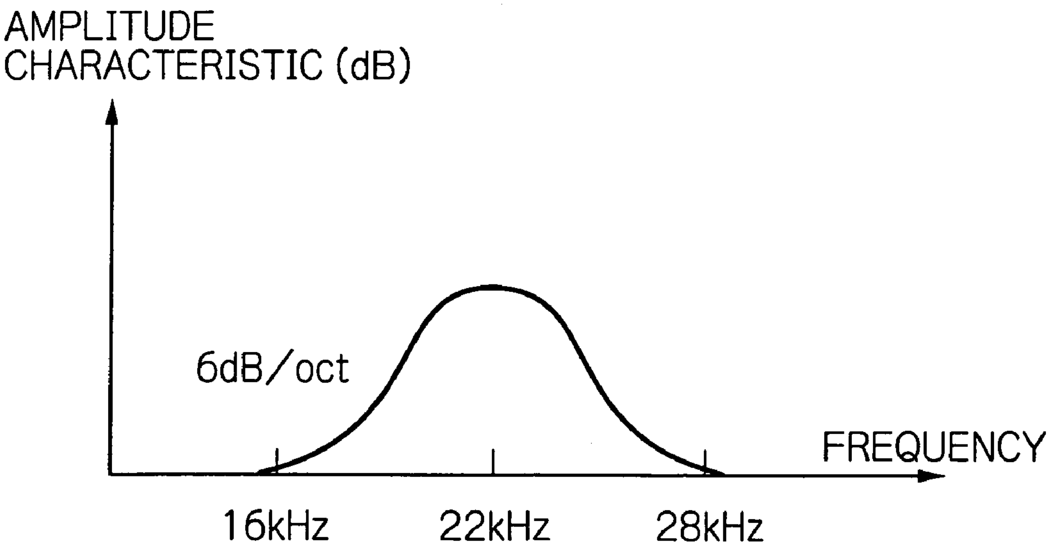
Fig. 3 PRIOR ART
FIG. 3 is a graph showing a frequency/amplitude characteristic of the prior art detector circuit shown in FIG. 2.

In this prior art, the band pass filter 42 may have a frequency/amplitude characteristic as shown in a graph of FIG. 3. As is apparent from this graph, each of the side bands of the amplitude characteristic features a gradual slope, and thus the detector circuit 36 is susceptible to a noise having a large amplitude, such as a spike noise or the like, which is generated when the power supply voltage signal is switched between the low voltage (e.g. 13 volts) and the high voltage (e.g. 18 volts) or which is generated from internal combustion engines of motorcycles or automobiles. Of course, when the spike noise is introduced in the detector circuit 36, a malfunction of the detector circuit 36 may occur. Namely, the control circuit 22 may mistakenly select which local oscillator 32L or 32H should be driven.

Also, in addition to the side bands of the amplitude characteristic featuring the gradual slope, since the band switching pulse signal has a small peak value of 0.6±0.2 volts, a sensitivity of the detector circuit 36 for detecting the band switching pulse signal (22±4 kHz) is inferior.

In short, in the prior art BS converter, it is impossible to obtain a satisfactorily reliable operation of the BS converter 10.

Note, in the above-mentioned prior art BS converter 10, although a low pass filter may be substituted for the band pass filter 42, the low pass filter is also susceptible to a noise having a large amplitude, such a spike noise or the like.

First Embodiment

Next, with reference to FIG. 4, a first embodiment of a broadcasting satellite (BS) converter according to the present invention is explained below.

Figure 4:
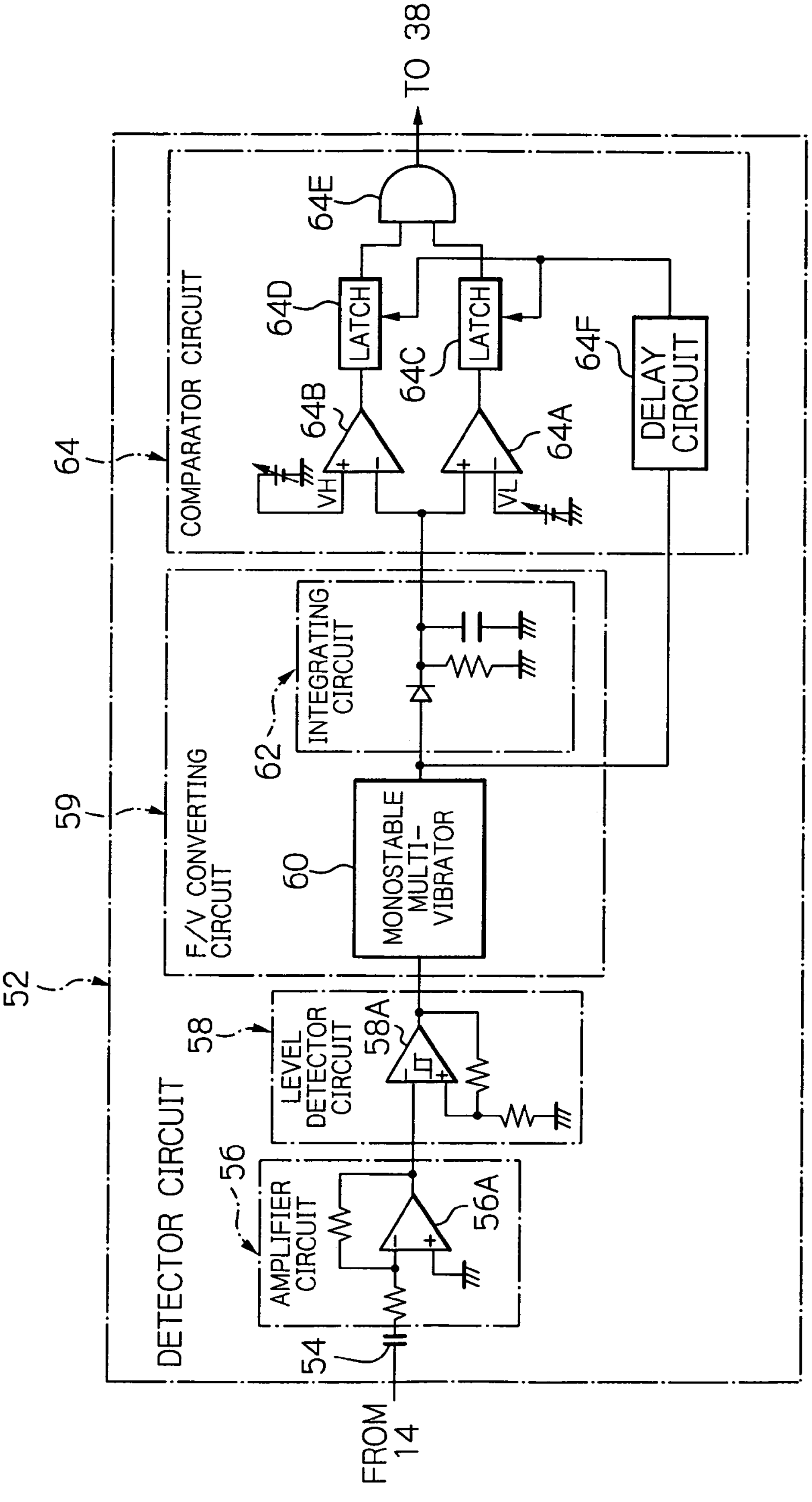
FIG. 4 is a circuit diagram of a detector circuit, used in a first embodiment of a broadcasting satellite converter according to the present invention, which is substituted for the prior art detector circuit shown in FIG. 1.

When this embodiment of the BS converter according to the present invention is illustrated in a block diagram, it is substantially identical to the block diagram shown in FIG. 1, except that a detector circuit, generally indicated by reference 52 in FIG. 4, is substituted for the detector circuit 36 shown in FIG. 2.

As shown in FIG. 4, the detector circuit 52 includes a capacitor 54, an amplifier circuit 56, a level detector circuit 58, a frequency-to-voltage (F/V) converting circuit 59 having a monostable (one shot) multivibrator 60 and an integrating circuit 62, and a comparator circuit 64.

The capacitor 54 prevents the inputting of the power supply voltage signal (13 volts or 18 volts) to the detector circuit 52. The amplifier circuit 56 includes an amplifier 56A, and resistors associated with the amplifier 56A. Namely, both the capacitor 54 and the amplifier circuit 56 form a high pass filter, so that a high frequency signal is allowed to be input to the level detector circuit 58.

Note, such a high frequency signal may be the band switching pulse signal (22±4 kHz) superimposed on the power supply voltage signal or a spike noise superimposed on the power supply voltage signal.

The level detector circuit 58 includes a comparator 58A featuring a hysteresis characteristic, and resistors associated with the comparator 58A. The level detector circuit 58 removes noises from the high frequency signal, and wave-shapes the high frequency signal output from the amplifier circuit 56.

In the one shot multivibrator 60 of the F/V converting circuit 59, a series of pulses having a predetermined pulse width is produced based on the wave-shaped high frequency signal output from the level detector 58, and is output to the integrating circuit 62 of the F/V converting circuit 59. The integrating circuit 62 is formed as an RC circuit featuring a diode, and produces a voltage signal based on the series of pulses output from the one shot multivibrator 60. Namely, the F/V converting circuit 59 serves as an analog converting circuit for converting the frequency of the band switching pulse signal (22±4 kHz) into an analog integrated value (voltage signal).

The comparator circuit 64 is constituted as a window-type comparator circuit including a first comparator 64A featuring a low reference voltage (VL), a second comparator 64B featuring a high reference voltage (VH), a first latch circuit 64C connected to an output terminal of the first comparator 64A, a second latch circuit 64D connected to an output terminal of the second comparator 64B, and an AND-gate 64E connected to output terminals of the first and second latch circuits 64C and 64D. In this comparator circuit 64, the voltage signal output from the integrating circuit 62 is compared with the low reference voltage (VL) and the high reference voltage (VH), whereby it is determined whether the voltage signal derives from the band switching pulse signal (22±4 kHz), as stated in detail hereinafter.

Also, the comparator circuit 64 includes a delay circuit 64F which produces a latch timing signal based on the series of pulses output from the one shot multivibrator 60 of the F/V converting circuit 59. When the latch timing signal is output from the delay circuit 64F to the first and second latch circuits 64C and 64D, each of the first and second latch circuits 64C and 64D latches one bit datum output from a corresponding comparator (64A, 64B), and the latched one bit datum is output from a corresponding latch circuit (64C, 64D) to the AND-gate 64E. Note, each of the first and second latch circuits 64C and 64D may be formed as a D-type flip-flop.

Next, with reference to timing charts of FIGS. 5A, 5B, 5C, 5D and 5E, timing charts of FIGS. 6A, 6B, 6C, 6D and 6E, and timing charts of FIGS. 7A, 7B, 7C, 7D and 7E, an operation of the detector circuit 52 will be now explained below.

For example, when the band switching pulse signal having the frequency of 22±4 kHz is superimposed on the power supply voltage signal (13 volts or 18 volts) in the BS tuner 14 by tuning the television set to a channel to receive a BS signal included in the high frequency band of 11.7 GHz to 12.75 GHz, the band switching pulse signal is input to the amplifier circuit 56 through the capacitor 54. Namely, the band switching pulse signal is amplified to a given voltage level by the amplifier 56A, and the amplified band switching pulse signal is input to the level detector circuit 58.

In the level detector circuit 58, the amplified band switching pulse signal is compared with a predetermined threshold voltage by the comparator 58A. Since the threshold voltage is previously set so as to be lower than a peak voltage of the amplified band switching pulse signal, a pulse signal, having substantially the same frequency as that (22±4 kHz) of the band switching pulse signal, is output from the level detector circuit 58, as shown in the timing chart of FIG. 5A. Thus, although the pulse signal, which is output from the level detector circuit 58, may be referred to as a band switching pulse signal, this band switching pulse signal is free from the various noises involved in the original band switching pulse signal, due to the hysteresis characteristic of the comparator 58A. In short, the band switching pulse signal is wave-shaped by the comparator 58A, and the wave-shaped band switching pulse signal is input to the one shot multivibrator 60 of the F/V converting circuit 59.

Figure 5A:
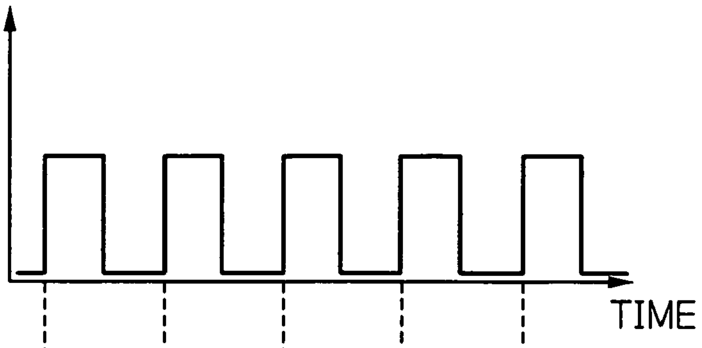
FIG. 5A is a timing chart to explain an operation of a level detector circuit shown in FIG. 4, when a band switching pulse signal is superimposed on a power supply voltage signal.

Note, as is apparent from the timing chart of FIG. 5A, the wave-shaped band switching pulse signal, which is output from the level detector circuit 58, may feature a duty factor of approximately 50%.

Figure 5B:
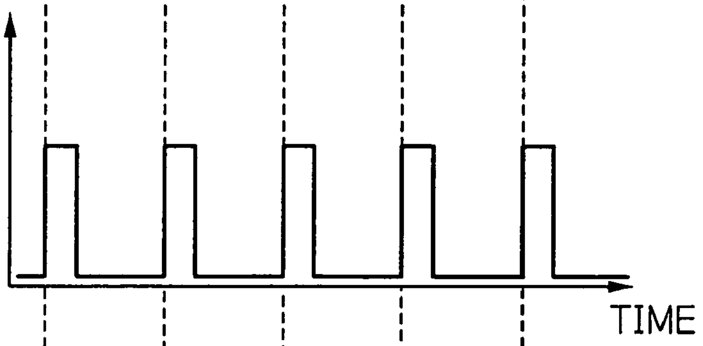
FIG. 5B is a timing chart to explain an operation of a one shot multivibrator shown in FIG. 4, when the band switching pulse signal is superimposed on the power supply voltage signal.

The one shot multivibrator 60 of the F/V converting circuit 59 is triggered by a rising edge of each of the pulses included in the wave-shaped band switching pulse signal (22±4 kHz), to thereby produce and output a series of pulses having a given pulse width and a duty factor of less than 50%, as shown in the timing chart of FIG. 5B. Preferably, the pulse width of the pulses, which are output from the one shot multivibrator 60, is less than half of a cycle of the wave-shaped band switching pulse signal output from the level detector circuit 58, but the pulse width concerned may be somewhat more than half of the cycle of the wave-shaped band switching pulse signal, if necessary. In any event, as is apparent from the timing chart of FIG. 5B, the duty factor of the pulses, which are output from the one shot multivibrator 60, is made smaller than that (approximately 50%) of the wave-shaped band switching pulse signal.

In this first embodiment, although the intermediate frequency signals BS-IF are input together with the band switching pulse signal to the amplifier circuit 56, they cannot be detected by the level detector circuit 58, because of very small amplitudes of the intermediate frequency signals BS-IF. Namely, the level detector circuit 58 can detect the band switching pulse signal having an amplitude or peak-to-peak voltage, which may be on the order of 600 m volts, but it is impossible to detect the intermediate frequency signals BS-IF having the amplitude which may be several μ volts. In short, the inputting of the intermediate frequency signals BS-IF to the one shot multivibrator 60 of the F/V converting circuit 59 is blocked out by the level detector circuit 58.

Figure 5C:
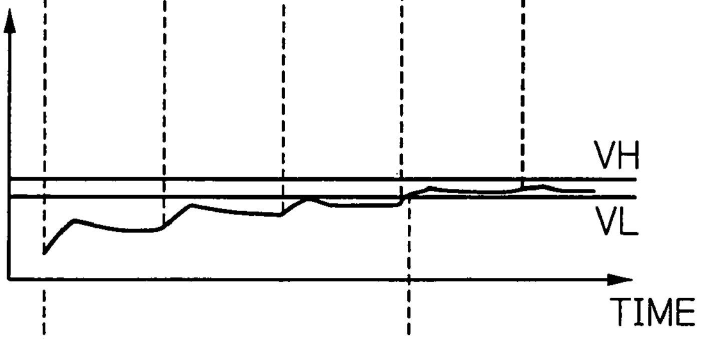
FIG. 5C is a timing chart to explain an operation of an integrating circuit shown in FIG. 4, when the band switching pulse signal is superimposed on the power supply voltage signal.

The pulses, which are output from the one shot multivibrator 60, are input to the integrating circuit 62 of the F/V converting circuit 59, in which the pulses are integrated to thereby produce a voltage signal based on the duty factor of the pulses concerned, and the voltage signal gradually rises, as shown in the timing chart of FIG. 5C. In particular, the integrating circuit 62 is constituted such that the voltage signal reaches a voltage falling within the range between the low reference voltage (VL) and the high reference voltage (VH) when the pulses, which are output from the one shot multivibrator 60, are derived from the band switching pulse signal having the frequency of 22±4 kHz. Namely, a time constant of the integrating circuit 62 is previously determined such that the voltage signal becomes steady at a voltage falling within the range between the low reference voltage (VL) and the high reference voltage (VH).

The voltage signal, produced by the integrating circuit 62, is input to both the first and second comparators 64A and 64B of the window-type comparator circuit 64. When the voltage signal has a voltage which is lower than the low reference voltage (VL), the first comparator 64A outputs a low level signal to the first latch circuit 64C, and the second comparator 64B outputs a high level signal to the second latch circuit 64D. When the voltage signal exceeds the low reference voltage (VL), i.e. when the voltage signal becomes steady at the voltage falling within the range between the low reference voltage (VL) and the high reference voltage (VH), the low level signal, which is output from the first comparator 64A to the first latch circuit 64C, is changed to a high level signal.

In short, while the band switching pulse signal (22±4 kHz) is superimposed on the power supply voltage signal (13 volts or 18 volts), both the first and second comparators 64A and 64B output the high level signals to the first and second latch circuits 64C and 64D, respectively.

On the other hand, the pulses, which are output from the one shot multivibrator 60, are input to the delay circuit 64F, in which a latch timing signal is produced based on the pulses output from the one shot multivibrator 60. The delay circuit 64F is constituted so as to produce and output a latch timing signal at a predetermined time point $T_{M0}$ measured from a time point at which the inputting of the pulses from the one shot multivibrator 60 to the delay circuit 64F is commenced, as shown in the timing chart of FIG. 5D. Note, as is apparent from this timing chart, at the time point $T_{M0}$, the voltage signal has reached the voltage falling within the range between the low reference voltage (VL) and the high reference voltage (VH).

When the latch timing signal is input from the delay circuit 64F to both the first and second latch circuits 64C and 64D, the respective high level signals, which are output from the first and second comparators 64A and 64B, are latched in the first and second latch circuits 64C and 64D, so that high level signals are output from the first and second latch circuits 64C and 64D to the AND-gate 64E. When both the high level signals are input from the first and second latch circuits 64C and 64D to the AND-gate 64E, a high level signal is output from the AND-gate 64E to the selector circuit 38 (FIG. 1), as shown in the timing chart of FIG. 5E.

Thus, similar to the above-mentioned prior art BS converter shown in FIG. 1, when the television set, connected to the BS tuner 14, is tuned to a channel to receive a BS signal included in the high frequency band of 11.7 GHz to 12.75 GHz, i.e. when the band switching pulse signal is superimposed on the power supply voltage signal (13 volts or 18 volts) in the BS tuner 14, the first drive control signal, which is output from the selector circuit 38 to the first local frequency oscillator 32L, is changed from the high level to the low level so that the driving of the first local frequency oscillator 32L is stopped. On the other hand, the second drive control signal, which is output from the selector circuit 38 to the second local frequency oscillator 32H, is changed from the low level to a high level so that the second local frequency oscillator 32H is driven.

In short, while the band switching pulse signal (22±4 kHz) is superimposed on the power supply voltage signal (13 volts or 18 volts), only the second local frequency oscillator 32H is driven so that the BS signals, included in the high frequency band of 11.7 GHz to 12.75 GHz, are converted into the intermediate frequency signals BS-IF.

While the band switching pulse signal is not superimposed on the power supply voltage signal (13 volts or 18 volts) in the BS tuner 14, i.e. while the television set is tuned to a channel to receive a BS signal included in the low frequency band of 10.7 GHz to 11.7, a low frequency spike noise having a lower frequency than that (22±4 kHz) of the band switching pulse signal may be superimposed on the power supply voltage signal.

In this case, the low frequency spike noise is input to the amplifier circuit 56 through the capacitor 54. Namely, the low frequency spike noise is amplified to a given voltage level by the amplifier 56A, and the amplified low frequency spike noise is input to the level detector circuit 58, in which the amplified low frequency spike noise is compared with the predetermined threshold voltage by the comparator 58A. If the threshold voltage is lower than a peak voltage of the amplified low frequency spike noise, a pulse spike noise, having substantially the same frequency as that of the low frequency spike noise, is output from the level detector circuit 58, as shown in the timing chart of FIG. 6A. Namely, the low frequency spike noise is wave-shaped by the comparator 58A, and the wave-shaped low frequency spike noise is input to the one shot multivibrator 60.

Figures 6A, 6B, 6C, 6D, 6E:
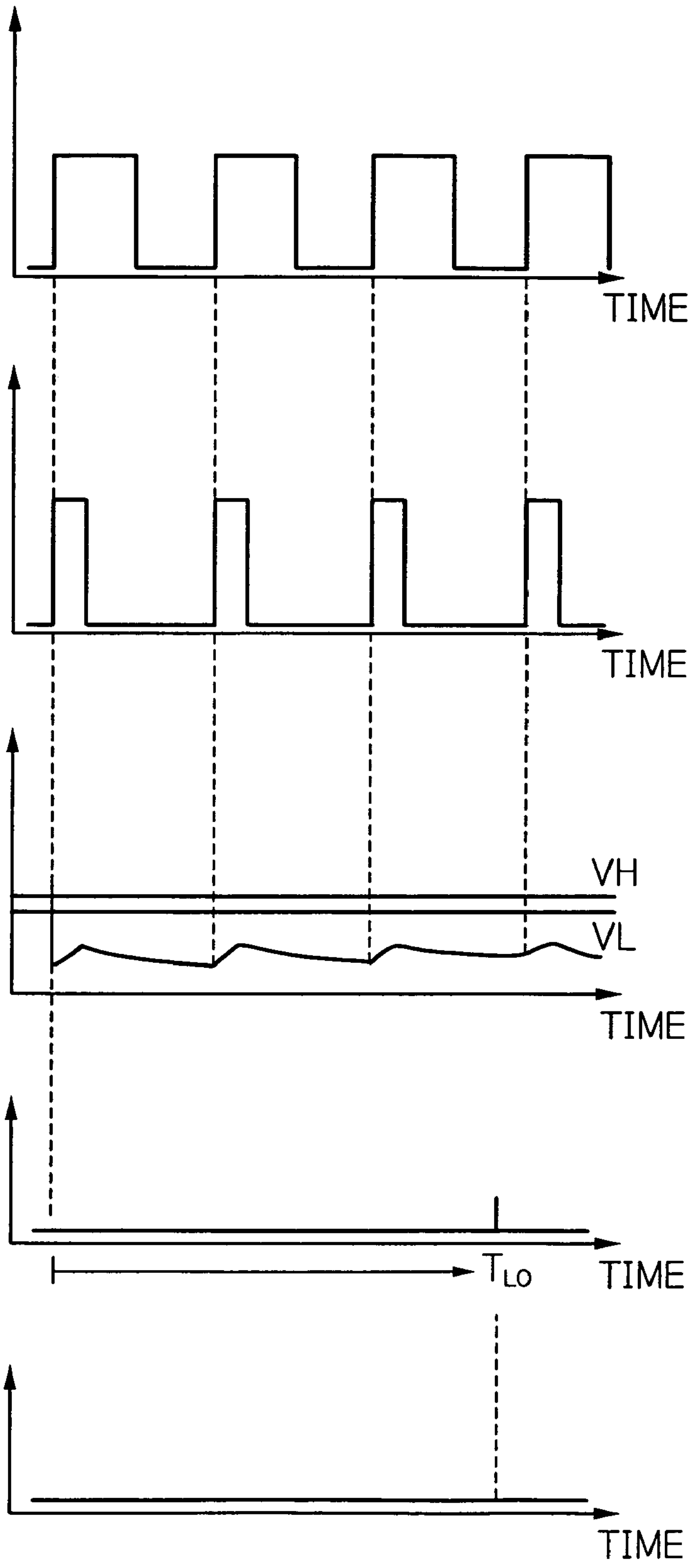
FIG. 6A is a timing chart to explain an operation of the level detector circuit shown in FIG. 4, when a low frequency spike noise having a frequency lower than that of the band switching pulse signal is superimposed on the power supply voltage signal.
FIG. 6B is a timing chart to explain an operation of the one shot multivibrator shown in FIG. 4, when the low frequency spike noise is superimposed on the power supply voltage signal.
FIG. 6C is a timing chart to explain an operation of the integrating circuit shown in FIG. 4, when the low frequency spike noise is superimposed on the power supply voltage signal.
FIG. 6D is a timing chart to explain an operation of the delay circuit of the comparator circuit shown in FIG. 4, when the low frequency spike noise is superimposed on the power supply voltage signal.
FIG. 6E is a timing chart to explain an operation of the AND-gate of the comparator circuit shown in FIG. 4, when the low frequency spike noise is superimposed on the power supply voltage signal.

Note, as is apparent from the timing chart of FIG. 6A, the wave-shaped low frequency spike noise, which is output from the level detector circuit 58, may feature a duty factor of approximately 50%.

The one shot multivibrator 60 of the F/V converting circuit 59 is triggered by a rising edge of each of the pulses included in the wave-shaped low frequency spike noise, to thereby produce and output a series of noise pulses having a given pulse width and a duty factor of less than 50%, as shown in the timing chart of FIG. 6B.

Note, the pulse width of the noise pulses, which are output from the one shot multivibrator 60, is substantially the same as that of the pulses which are derived from the aforesaid wave-shaped band switching pulse signal (FIG. 5B), but the noise pulses have a smaller duty factor than that of the pulses which are derived from the aforesaid wave-shaped band switching pulse signal (FIG. 5B), due to the fact that the low frequency spike noise has the lower frequency than that (22±4 kHz) of the band switching pulse signal.

The noise pulses, which are output from the one shot multivibrator 60, are input to the integrating circuit 62 of the F/V converting circuit 59, in which the noise pulses are integrated to thereby produce a voltage signal based on the duty factor of the noise pulses, and the voltage signal becomes steady without exceeding the low reference voltage (VL), as shown in the timing chart of FIG. 6C, because the low frequency spike noise has the lower frequency than that (22±4 kHz) of the band switching pulse signal.

The voltage signal, produced by the integrating circuit 62, is input to both the first and second comparators 64A and 64B of the window-type comparator circuit 64. Since the voltage signal has a voltage which is lower than the low reference voltage (VL), the first comparator 64A outputs a low level signal to the first latch circuit 64C, and the second comparator 64B outputs a high level signal to the second latch circuit 64D.

In short, while the low frequency spike noise is superimposed on the power supply voltage signal (13 volts or 18 volts), the first and second comparators 64A and 64B output the low and high level signals to the first and second latch circuits 64C and 64D, respectively.

On the other hand, the noise pulses, which are output from the one shot multivibrator 60 of the F/V converting circuit 59, are input to the delay circuit 64F, in which a latch timing signal is produced based on the noise pulses output from the one shot multivibrator 60 at a time point $T_{L0}$ measured from a time point at which the inputting of the noise pulses from the one shot multivibrator 60 to the delay circuit 64F is commenced, as shown in the timing chart of FIG. 6D. Note, the time point $T_{L0}$ becomes later than the time point $T_{M0}$ (FIG. 5D) for the reasons stated hereinafter.

When the latch timing signal is input from the delay circuit 64F to both the first and second latch circuits 64C and 64D, the respective low and high level signals, which are output from the first and second comparators 64A and 64B, are latched in the first and second latch circuits 64C and 64D, so that respective low and high level signals are output from the first and second latch circuits 64C and 64D to the AND-gate 64E. Thus, the signal, which is output from the AND-gate 64E to the selector circuit 38 (FIG. 1), is maintained at the low level, as shown in the timing chart of FIG. 6E.

In short, although the low frequency spike noise having the lower frequency than that (22±4 kHz) of the band 30 switching pulse signal is superimposed on the power supply voltage signal (13 volts or 18 volts), the detector circuit 52 does not recognize the low frequency spike noise as the band switching signal.

Also, while the band switching pulse signal is not superimposed on the power supply voltage signal (13 volts or 18 volts) in the BS tuner 14, i.e. while the television set is tuned to a channel to receive a BS signal included in the low frequency band of 10.7 GHz to 11.7, a high frequency spike noise having a higher frequency than that (22±4 kHz) of the band switching pulse signal may be superimposed on the power supply voltage signal.

In this case, the high frequency spike noise is input to the amplifier circuit 56 through the capacitor 54. Namely, the high frequency spike noise is amplified to a given voltage level by the amplifier 56A, and the amplified high frequency spike noise is input to the level detector circuit 58, in which the amplified high frequency spike noise is compared with the predetermined threshold voltage by the comparator 58A. If the threshold voltage is lower than a peak voltage of the amplified high frequency spike noise, a pulse spike noise, having substantially the same frequency as that of the high frequency spike noise, is output from the level detector circuit 58, as shown in the timing chart of FIG. 7A. Namely, the high frequency spike noise is wave-shaped by the comparator 58A, and the wave-shaped high frequency spike noise is input to the one shot multivibrator 60.

Figures 7A, 7B, 7C, 7D, 7E:
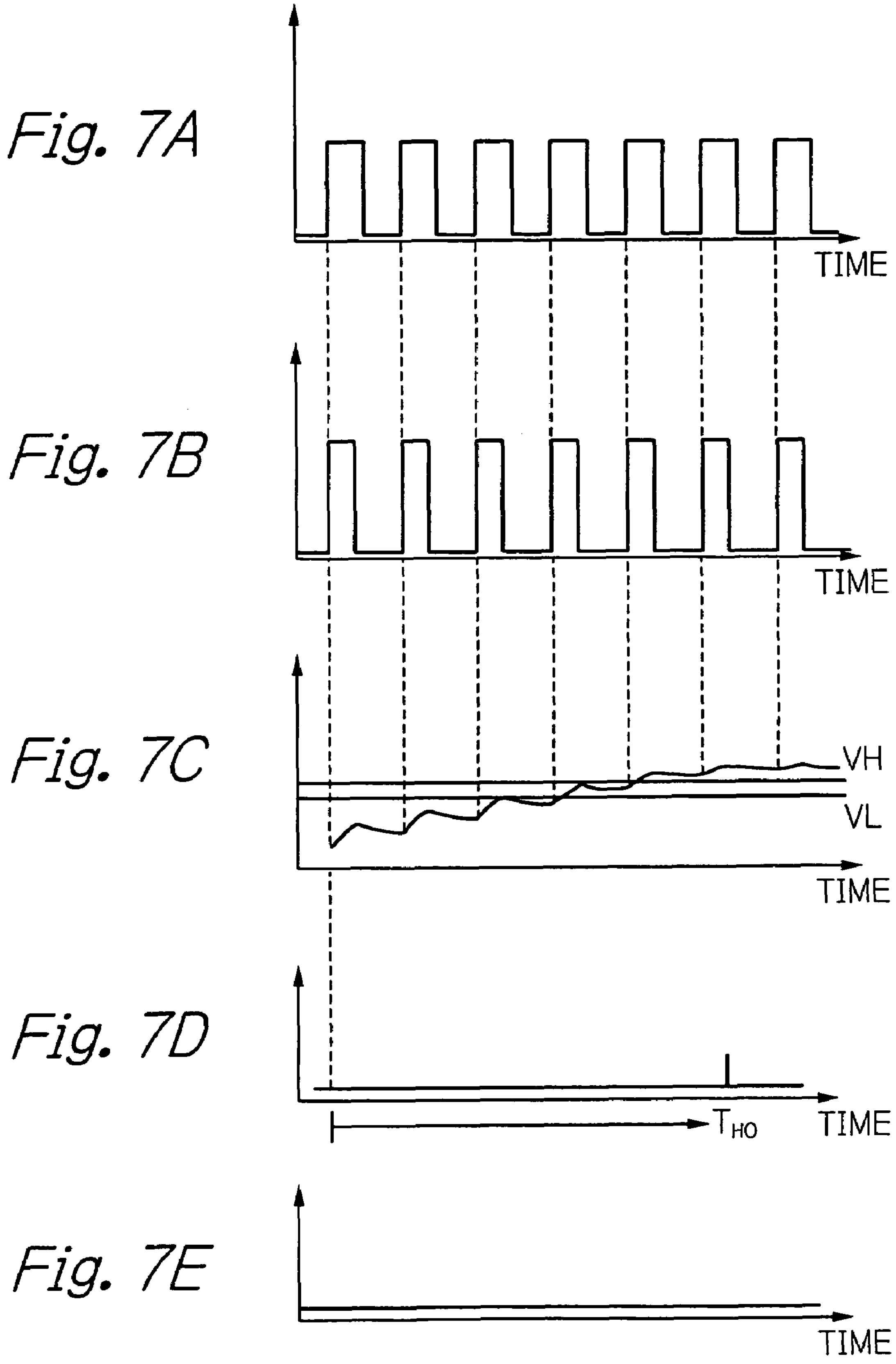
FIG. 7A is a timing chart to explain an operation of the level detector circuit shown in FIG. 4, when a high frequency spike noise having a frequency higher than that of the band switching pulse signal is superimposed on the power supply voltage signal.
FIG. 7B is a timing chart to explain an operation of the one shot multivibrator shown in FIG. 4, when the high frequency spike noise is superimposed on the power supply voltage signal.
FIG. 7C is a timing chart to explain an operation of the integrating circuit shown in FIG. 4, when the high frequency spike noise is superimposed on the power supply voltage signal.
FIG. 7D is a timing chart to explain an operation of the delay circuit of the comparator circuit shown in FIG. 4, when the high frequency spike noise is superimposed on the power supply voltage signal.
FIG. 7E is a timing chart to explain an operation of the AND-gate of the comparator circuit shown in FIG. 4, when the high frequency spike noise is superimposed on the power supply voltage signal.

Note, as is apparent from the timing chart of FIG. 7A, the wave-shaped high frequency spike noise, which is output from the level detector circuit 58, may feature a duty factor of approximately 50%.

The one shot multivibrator 60 of the F/V converting circuit 59 is triggered by a rising edge of each of the pulses included in the wave-shaped high frequency spike noise, to thereby produce and output a series of noise pulses having a given pulse width and a duty factor of less than 50%, as shown in the timing chart of FIG. 7B.

Note, the pulse width of the noise pulses, which are output from the one shot multivibrator 60, is substantially the same as that of the pulses which are derived from the aforesaid wave-shaped band switching pulse signal (FIG. 5B), but the noise pulses have a larger duty factor than that of the pulses which are derived from the aforesaid wave-shaped band switching pulse signal (FIG. 5B), due to the fact that the high frequency spike noise having the higher frequency than that (22±4 kHz) of the band switching pulse signal.

The noise pulses, which are output from the one shot multivibrator 60, are input to the integrating circuit 62 of the F/V converting circuit 59, in which the noise pulses are integrated to thereby produce a voltage signal based on the duty factor of the noise pulses, and the voltage signal becomes steady at a voltage exceeding the high reference voltage (VH), as shown in the timing chart of FIG. 7C, because the high frequency spike noise having the higher frequency than that (22±4 kHz) of the band switching pulse signal.

The voltage signal, produced by the integrating circuit 62, is input to both the first and second comparators 64A and 64B of the window-type comparator circuit 64. Since the voltage signal has a voltage which is higher than the high reference voltage (VH), the first comparator 64A outputs a high level signal to the first latch circuit 64C, and the second comparator 64B outputs a low level signal to the second latch circuit 64D.

In short, while the high frequency spike noise is superimposed on the power supply voltage signal (13 volts or 18 volts), the first and second comparators 64A and 64B output the high and low level signals to the first and second latch circuits 64C and 64D, respectively.

On the other hand, the noise pulses, which are output from the one shot multivibrator 60 of the F/V converting circuit 59, are input to the delay circuit 64F, in which a latch timing signal is produced based on the noise pulses output from the one shot multivibrator 60 at a time point $T_{H0}$ measured from a time point at which the inputting of the noise pulses from the one shot multivibrator 60 to the delay circuit 64F is commenced, as shown in the timing chart of FIG. 7D. Note, the time point $T_{H0}$ becomes earlier than the time point $T_{M0}$ (FIG. 5D) for the reasons stated hereinafter.

When the latch timing signal is input from the delay circuit 64F to both the first and second latch circuits 64C and 64D, the respective high and low level signals, which are output from the first and second comparators 64A and 64B, are latched in the first and second latch circuits 64C and 64D, so that respective high and low level signals are output from the first and second latch circuits 64C and 64D to the AND-gate 64E. Thus, the signal, which is output from the AND-gate 64E to the selector circuit 38 (FIG. 1) is maintained at the low level, as shown in the timing chart of FIG. 7E.

In short, while the television set is tuned to the channel to receive the BS signal included in the low frequency band of 10.7 GHz to 11.7, although the high frequency spike noise having a higher frequency than that (22±4 kHz) of the band switching pulse signal is superimposed on the power supply voltage signal (13 volts or 18 volts), the detector circuit 52 does not recognize the high frequency spike noise as the band switching signal.

FIG. 8 shows a circuit diagram of the delay circuit 64F included in the comparator circuit 64.

As shown in FIG. 8, the delay circuit 64F includes an integrating circuit 66, a level detector circuit 68, a differentiating circuit 70, and a rectifier circuit 72. The integrating circuit 66 is formed as an RC circuit featuring a diode. The level detector circuit 68 includes a comparator 58A featuring a hysteresis characteristic, and resistors associated with the comparator 68A. The rectifier circuit 72 is of an all-wave rectifier type With reference to timing charts of FIGS. 9A, 9B, 9C, 9D and 9E, an operation of the delay circuit 64F will be now explained below.

As stated above, when the band switching pulse signal (22±4 kHz) is superimposed on the power supply voltage signal (13 volts or 18 volts), the one shot multivibrator 60 of the F/V converting circuit 59 produces the series of pulses based on the wave-shaped band switching pulse signal. The pulses are output from the one shot multivibrator 60 to the integrating circuit 66 of the delay circuit 64F, as shown in the timing chart of FIG. 9A.

In the integrating circuit 66, the pulses output from the one shot multivibrator 60 are integrated to thereby produce a voltage signal, and then this voltage signal is output from the integrating circuit 66 to the level detector circuit 68. As shown in the timing chart of FIG. 9B, the voltage signal output from the integrating circuit 66 is gradually increased due to the inputting of the pulses to the integrating circuit 66. When the voltage signal output from the integrating circuit 66 exceeds a high threshold voltage ($Th_H$) set in the comparator 68A, an output signal output from the level detector circuit 68 is changed from a low level to a high level, as shown in the timing chart of FIG. 9C.

When the superimposition of the band switching pulse signal (22±4 kHz) on the power supply voltage signal (13 volts or 18 volts) is stopped (i.e. when the television set is tuned to a channel to receive a BS signal included in the low frequency band of 10.7 GHz to 11.7 GHz), the outputting of the pulses from the one shot multivibrator 60 ends, and thus the voltage signal output from the integrating circuit 66 is gradually decreased as shown in the timing chart of FIG. 9B. When the voltage signal output from the integrating circuit 66 falls below a low threshold voltage ($Th_L$) set in the comparator 68A, the output signal output from the level detector circuit 68 is changed from the high level to the low level, as shown in the timing chart of FIG. 9C.

The output signal, which is output from the level detector circuit 68, is input to the differentiating circuit 70, in which the changes of the output signal are detected. In particular, as shown in the timing chart of FIG. 9D, the differentiating circuit 70 outputs a positively-going pulse when detecting a rising edge at which the output signal is changed from the low level to the high level, and a negatively-going pulse when detecting a falling edge at which the output signal is changed from the high level to the low level.

The positively-going and negatively-going pulses are output from the differentiating circuit 70 to the all-wave rectifier circuit 72, in which each of the positively-going and negatively-going pulses is produced as a latch timing signal, as shown in the timing chart of FIG. 9E. Then, the latch timing signal is output from the all-wave rectifier circuit 72 to both the first and second latch circuits 64C and 64D.

Figure 5D:
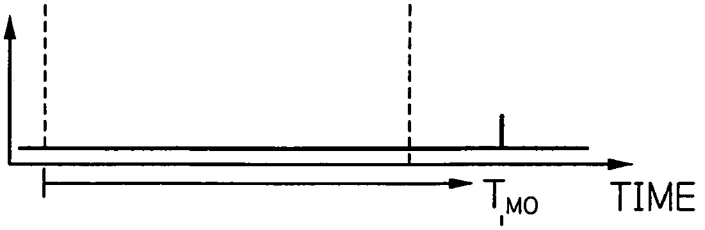
FIG. 5D is a timing chart to explain an operation of a delay circuit of a comparator circuit shown in FIG. 4, when the band switching pulse signal is superimposed on the power supply voltage signal.
Figure 5E:
FIG. 5E is a timing chart to explain an operation of an AND-gate of the comparator circuit shown in FIG. 4, when the band switching pulse signal is superimposed on the power supply voltage signal.

Of course, the latch timing signal, which is derived from the rising edge of the output signal (FIG. 9C) from the level detector circuit 68, corresponds to the latch timing signal output from the delay circuit 64F at the time point $T_{M0}$ shown in the timing chart of FIG. 5D.

When the latch timing signal, which is derived from the falling edge of the output signal (FIG. 9C) from the level detector circuit 68, is output to both the first and second latch circuits 64C and 64D, the voltage signal, which is output from the integrating circuit 62 (FIG. 4), falls below the low reference voltage (VL) of the first comparator 64A. Thus, the respective low and high level signals, which are output from the first and second comparators 64A and 64B, are latched in the first and second latch circuits 64C and 64D, so that respective low and high level signals are output from the first and second latch circuits 64C and 64D to the AND-gate 64E. Thus, the signal output from the AND-gate 64E to the selector circuit 38 (FIG. 1) is changed from the high level to the low level. As a result, the driving of the second local frequency oscillator 32H is stopped, and the first local frequency oscillator 32L is driven so that the BS signals included in the low frequency band of 10.7 GHz to 11.7 GHz are converted into the intermediate frequency signals.

When the above-mentioned low frequency spike noise (FIGS. 6A to 6E) is superimposed on the power supply voltage signal (13 volts or 18 volts), the output signal from the integrating circuit 66 reaches the high threshold voltage ($Th_H$) later in comparison with the case where the band switching pulse signal is superimposed on the power supply voltage signal, because the low frequency spike noise has the lower frequency than that (22±4 kHz) of the band switching pulse signal. Thus, the time point $T_{L0}$ (FIG. 6D) becomes later than the time point $T_{M0}$ (FIG. 5D).

Also, when the above-mentioned high frequency spike noise (FIGS. 7A to 7E) is superimposed on the power supply voltage signal (13 volts or 18 volts), the output signal from the integrating circuit 66 reaches the high threshold voltage ($Th_H$) earlier in comparison with the case where the band switching pulse signal is superimposed on the power supply voltage signal (13 volts or 18 volts), because the high frequency spike noise has the higher frequency than that (22±4 kHz) of the band switching pulse signal. Thus, the time point $T_{H0}$ (FIG. 7D) becomes earlier than the time point $T_{M0}$ (FIG. 5D).

In any event, it is possible to produce a latch timing signal at a proper timing in the delay circuit 64F by suitably setting a time constant of the integrating circuit 66, so that the superimposition of either the low or high frequency spike noise on the power supply voltage signal (13 volts or 18 volts) can be properly detected by the detector circuit 52.

Figure 10:
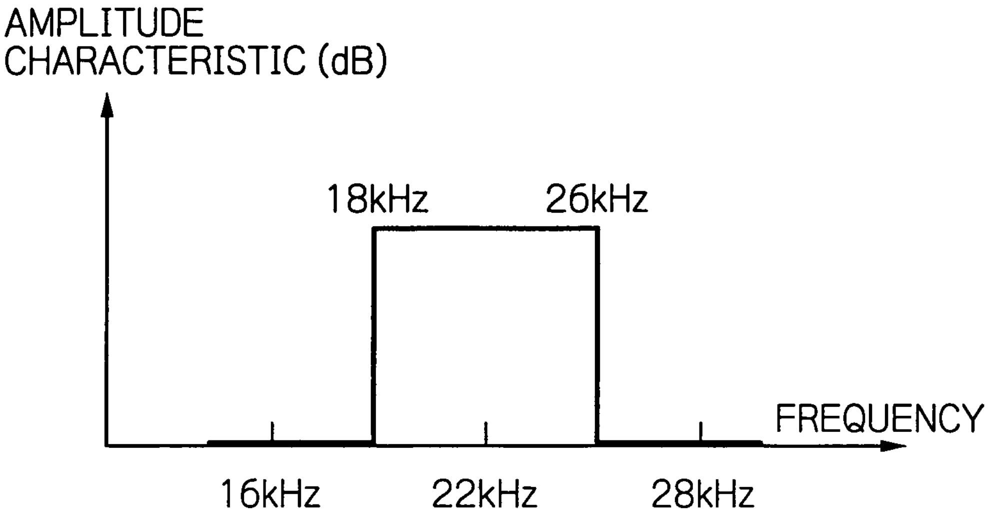
FIG. 10 is a graph showing a frequency/amplitude characteristic of the detector circuit shown in FIG. 4.

In this first embodiment, the detector circuit 52 may have a frequency/amplitude characteristic as shown in a graph of FIG. 10. As shown in this graph, the frequency/amplitude characteristic features a rectangular profile, the sides of which are defined by the frequencies of 18 kHz and 26 kHz, and thus the detector circuit 52 is not susceptible to various is noises, resulting in a satisfactorily reliable operation of the BS converter according to the present invention.

Also, according to the present invention, whenever the band switching pulse signal (22±4 kHz) is superimposed on the power supply voltage signal (13 volts or 18 volts), it is possible to securely detect the superimposition of the band switching pulse signal on the power supply voltage signal, and thus a sensitivity of the detector circuit 52 for detecting the band switching pulse signal is superior to the case of the above-mentioned prior art BS converter. It is possible to make various modifications to the above-mentioned first embodiment.

Figure 11:
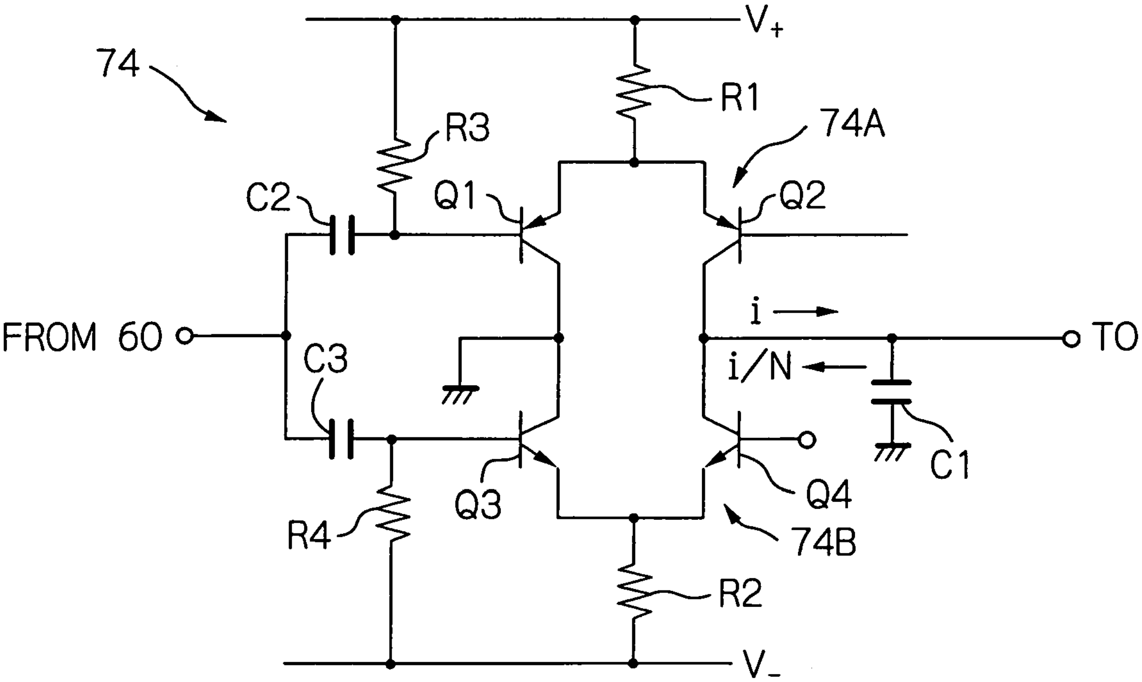
FIG. 11 is a wiring diagram of a constant-current type charging/discharging circuit which may be substituted for the integrating circuit shown in FIG. 4.

For example, the integrating circuit 62 (FIG. 4) may be replaced with another integrating circuit, which is formed as a constant-current type charging/discharging circuit as shown in FIG. 11.

The constant-current type charging/discharging circuit, generally indicated by reference 74, includes: a first differential amplifier 74A having two NPN-type transistors Q1 and Q2 forming a differential pair; a second differential amplifier 74B having two PNP-type transistors Q3 and Q4 forming a differential pair; capacitors C1, C2 and C3; and resistors R1, R2, R3 and R4, and these elements are arranged as shown in FIG. 11.

In particular, one terminal of the resistor R1 is connected to a common emitter of the NPN-type transistors Q1 and Q2, and the other terminal of the resistor R1 forms a $V_+$-terminal to which a high voltage ($V_+$) is applied. Also, one terminal of the resistor R2 is connected to a common emitter of the PNP-type transistors Q3 and Q4, and the other terminal of resistor R1 forms a $V_-$ terminal to which a low voltage ($V_-$) is applied. Both collectors of the NPN-type and PNP-type transistors Q1 and Q2 are grounded. Both collectors of the NPN-type and PNP-type transistors Q2 and Q4 are connected to one terminal of the capacitor C1 which is connected to the first and second comparators 64A and 64B, and the other terminal of the capacitor C1 is grounded.

A constant high bias voltage, which falls within a range between the high voltage ($V_+$) and the ground level voltage (0 volt), is applied to a base of the NPN-type transistor Q2. On the other hand, a constant low bias voltage, which falls within a range between the ground level voltage (0 volt) and the low voltage ($V_-$), is applied to a base of the PNP-type transistor Q4.

A base of the NPN-type transistor Q1 is connected to one terminal of the capacitor C2, and the other terminal capacitor C2 is connected to the one shot multivibrator 60. Also, one terminal of the resistor R3 is connected to the base of the NPN-type transistor Q1, and the other terminal of the resistor R3 forms a $V_+$-terminal to which a high voltage ($V_+$) is applied.

A base of the PNP-type transistor Q3 is connected to one terminal of the capacitor C3, and the other terminal capacitor C2 is connected to the one shot multivibrator 60. Also, one terminal of the resistor R4 is connected to the base of the PNP-type transistor Q3, and the other terminal of the resistor R4 forms a $V_+$-terminal to which a high voltage ($V_+$) is applied.

In operation, when each of the pulses is input from the one shot multivibrator 60 to the capacitors C2 and C3, both the NPN-type and PNP-type transistors Q1 and Q4 are turned OFF, and both the NPN-type and PNP-type transistors Q2 and Q3 are turned ON. Thus, the capacitor C1 is charged with a current i flowing through the NPN-transistor Q2. Note, the current i is determined by a resistance value of the resistor R1.

On the other hand, when each of the pulses is not input from the one shot multivibrator 60 to the capacitors C2 and C3, both the NPN-type and PNP-type transistors Q2 and Q3 are turned OFF, and both the NPN-type and PNP-type transistors Q1 and Q4 are turned ON. Thus, the capacitor C1 is discharged with a current i/N flowing through the PNP-type transistor Q4 ("N", is a positive integer of more than one). Note, the current i/N is determined by a resistance value of the resistor R2.

Therefore, it is possible to substitute the aforesaid constant-current type charging/discharging circuit 74 for the integrating circuit 62 (FIG. 4).

Figure 12:
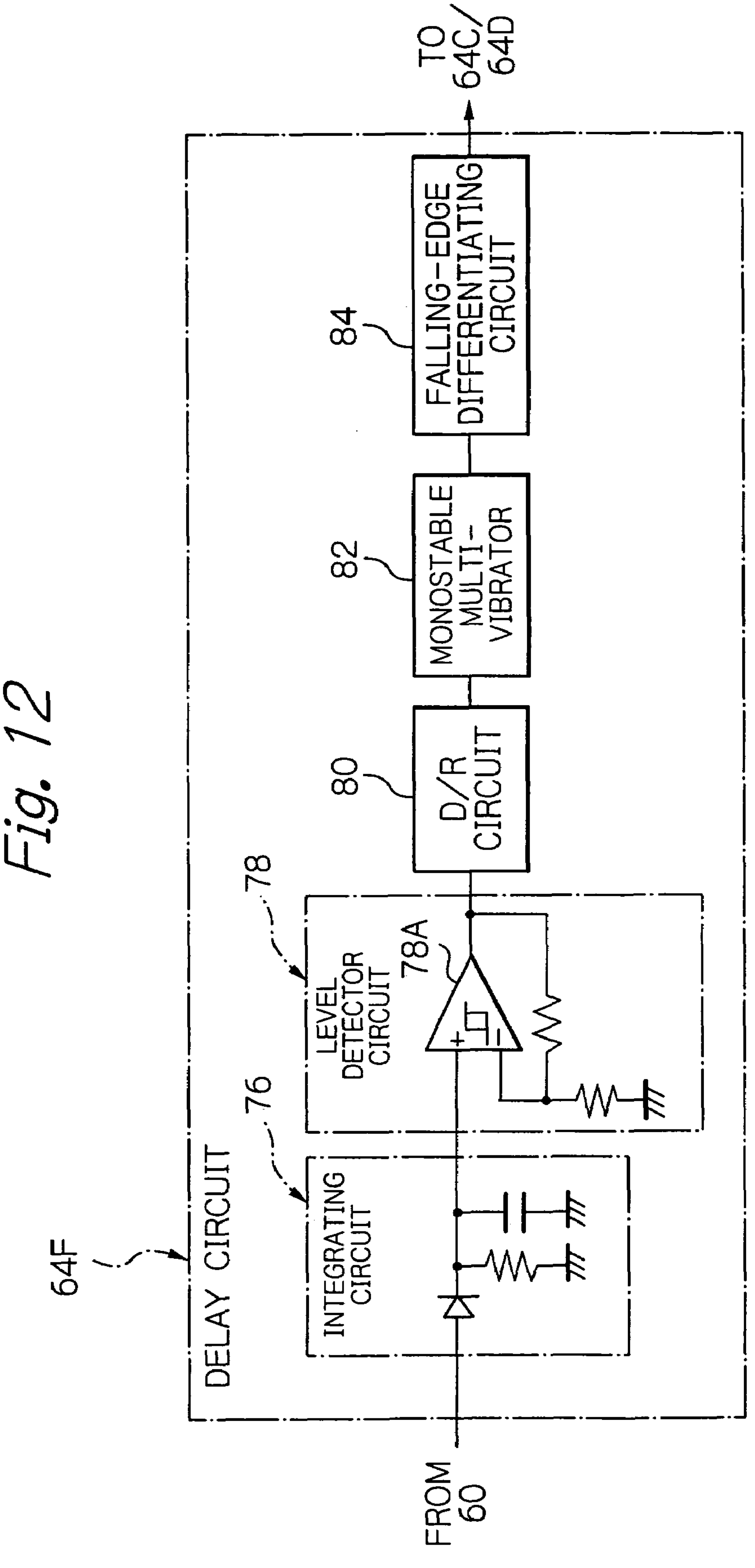
FIG. 12 is another circuit diagram of the delay circuit shown in FIG. 4.

Further, in the above-mentioned first embodiment, the delay circuit 64F may be constituted as shown in FIG. 12, as a substitute for the arrangement shown in FIG. 8.

In particular, in this modification, the delay circuit 64F includes an integrating circuit 76, a level detector circuit 78, a differentiating/rectifying (D/R) circuit 80, and a monostable (one shot) multivibrator 82 and a falling-edge differentiating circuit 84. The integrating circuit 76 is formed as an RC circuit featuring a diode. The level detector circuit 78 includes a comparator 78A featuring a hysteresis characteristic, and resistors associated with the comparator 78A.

With reference to timing charts of FIGS. 13A, 13B, 13C, 13D, 13E and 13F, an operation of the delay circuit 64F shown in FIG. 12 will be now explained below.

When the band switching pulse signal (22±4 kHz) is superimposed on the power supply voltage signal (13 volts or 18 volts), the one shot multivibrator 60 (FIG. 4) produces the series of pulses based on the wave-shaped band switching pulse signal (22±4 kHz). The pulses are output from the one shot multivibrator 60 to the integrating circuit 76 of the delay circuit 64F, as shown in the timing chart of FIG. 13A.

In the integrating circuit 76, the pulses output from the one shot multivibrator 60 are integrated to thereby produce a voltage signal, and then this voltage signal is output from the integrating circuit 76 to the level detector circuit 78. As shown in the timing chart of FIG. 13B, the voltage signal output from the integrating circuit 76 is gradually increased due to the inputting of the pulses to the integrating circuit 76. When the voltage signal output from the integrating circuit 76 exceeds a high threshold voltage ($Th_H$) set in the comparator 78A, an output signal output from the level detector circuit 78 is changed from a low level to a high level, as shown in the timing chart of FIG. 13C.

Figures 13A, 13B, 13C, 13D, 13E, 13F:
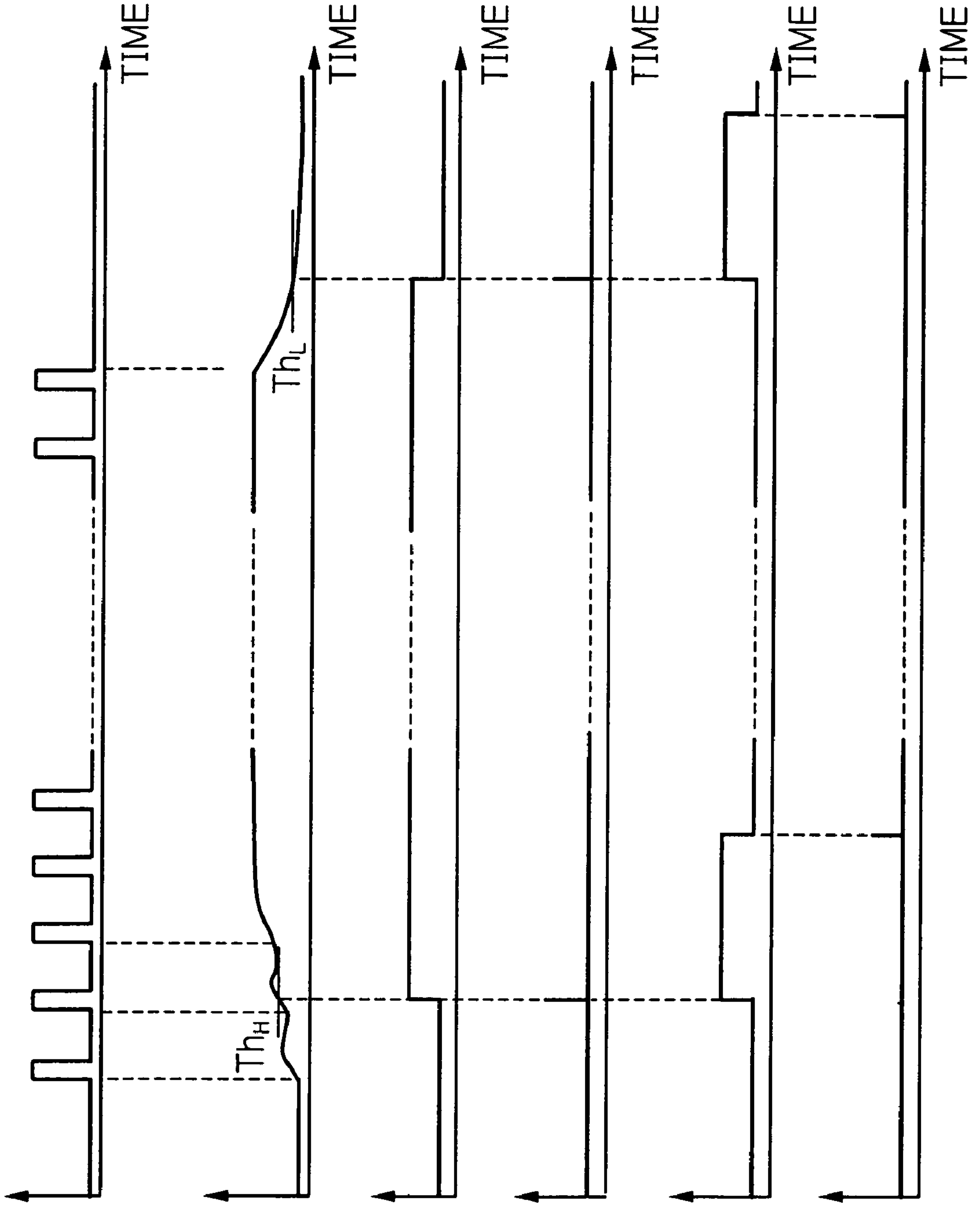
FIG. 13A is a timing chart showing a series of pulses output from the one shot multivibrator shown in FIG. 4, when the band switching pulse signal is input to the detector circuit according to the present.
FIG. 13B is a timing chart to explain an operation of an integrating circuit shown in FIG. 12, when the band switching pulse signal is input to the detector circuit according to the present invention.
FIG. 13C is a timing chart to explain an operation of a level detector circuit shown in FIG. 12, when the band switching pulse signal is input to the detector circuit according to the present invention.
FIG. 13D is a timing chart to explain an operation of a differentiating/rectifying circuit shown in FIG. 12, when the band switching pulse signal is input to the detector circuit according to the present invention.
FIG. 13E is a timing chart to explain an operation of a monostable multivibrator shown in FIG. 12, when the band switching pulse signal is input to the detector circuit according to the present invention.
FIG. 13F is a timing chart to explain an operation of a falling-edge differentiating circuit shown in FIG. 12, when the band switching pulse signal is input to the detector circuit according to the present invention.

When the superimposition of the band switching pulse signal (22±4 kHz) on the power supply voltage signal (13 volts or 18 volts) is stopped (i.e. when the television set is tuned to a channel to receive a BS signal included in the low frequency band of 10.7 GHz to 11.7 GHz), the outputting of the pulses from the one shot multivibrator 60 ends, and thus the voltage signal output from the integrating circuit 76 is gradually decreased as shown in the timing chart of FIG. 13B. When the voltage signal output from the integrating circuit 76 falls below a low threshold voltage ($Th_L$) set in the comparator 78A, the output signal output from the level detector circuit 78 is changed from the high level to the low level, as shown in the timing chart of FIG. 13C.

The output signal output from the level detector circuit 78 is input to the D/R circuit 80, in which the changes or rising and falling edges of the output signal are detected and all-wave-rectified. In particular, as shown in the timing chart of FIG. 13D, the D/R circuit 80 outputs two positively-going pulses due to the all-wave rectification when detecting the respective rising and falling edges of the output signal output from the level detector circuit 78.

When each of the positively-going pulses is input from the D/R circuit to the one shot multivibrator 82 (FIG. 12), a pulse having a given pulse width is output from the one shot multivibrator 82, as shown in the timing chart of FIG. 13E. Note, it is possible to obtain the given pulse width of the pulse by suitably setting a time constant in the one shot multivibrator 82.

Each of the pulses, which is output from the one shot multivibrator 82, is input to the falling-edge differentiating circuit 84, in which a falling-edge of the pulse is detected. In particular, a latch timing signal is produced at the falling edge of the pulse, as shown in the timing chart of FIG. 13F, and is output to both the first and second latch circuits 64C and 64D.

Of course, the latch timing signal, which is derived from the rising edge of the output signal (FIG. 13C) from the level detector circuit 78, corresponds to the latch timing signal output from the delay circuit 64F at the time point $T_{M0}$ shown in the timing chart of FIG. 5D.

When the latch timing signal, which is derived from the falling edge of the output signal (FIG. 13C) from the level detector circuit 78, is output to both the first and second latch circuits 64C and 64D, the voltage signal, which is output from the integrating circuit 62 (FIG. 4), falls below the low reference voltage (VL) of the first comparator 64A. Thus, the respective low and high level signals, which are output from the first and second comparators 64A and 64B, are latched in the first and second latch circuits 64C and 64D, so that respective low and high level signals are output from the first and second latch circuits 64C and 64D to the AND-gate 64E. Thus, the signal output from the AND-gate 64E to the selector circuit 38 (FIG. 1) is changed from the high level to the low level. As a result, the driving of the second local frequency oscillator 32H is stopped, and the first local frequency oscillator 32L is driven so that the BS signals included in the low frequency band of 10.7 GHz to 11.7 GHz are converted into the intermediate frequency signals.

Similar to the delay circuit (64F) shown in FIG. 8, when the above-mentioned low frequency spike noise (FIGS. 6A to 6E) is superimposed on the power supply voltage signal (13 volts or 18 volts), the output signal from the integrating circuit 76 reaches the high threshold voltage ($Th_H$) later in comparison with the case where the band switching pulse signal is superimposed on the power supply voltage signal (13 volts or 18 volts), because the low frequency spike noise has the lower frequency than that (22±4 kHz) of the band switching pulse signal. Thus, the time point $T_{L0}$ (FIG. 6D) becomes later than the time point $T_{M0}$ (FIG. 5D).

Also, when the above-mentioned high frequency spike noise (FIGS. 7A to 7E) is superimposed on the power supply voltage signal (13 volts or 18 volts), the output signal from the integrating circuit 76 reaches the high threshold voltage ($Th_H$) earlier in comparison with the case where the band switching pulse signal is superimposed on the power supply voltage signal, because the high frequency spike noise has the higher frequency than that (22±4 kHz) of the band switching pulse signal. Thus, the time point $T_{H0}$ (FIG. 7D) becomes earlier than the time point $T_{M0}$ (FIG. 5D).

In any event, it is possible to produce a latch timing signal at a proper timing in the delay circuit 64F by suitably setting a time constant of the integrating circuit 76, so that the superimposition of either the low or high frequency spike noise on the power supply voltage signal (13 volts or 18 volts) can be properly detected by the detector circuit 52.

Second Embodiment

Next, with reference to FIG. 14, a second embodiment of the broadcasting satellite (BS) converter according to the present invention is explained below.

Figure 14:
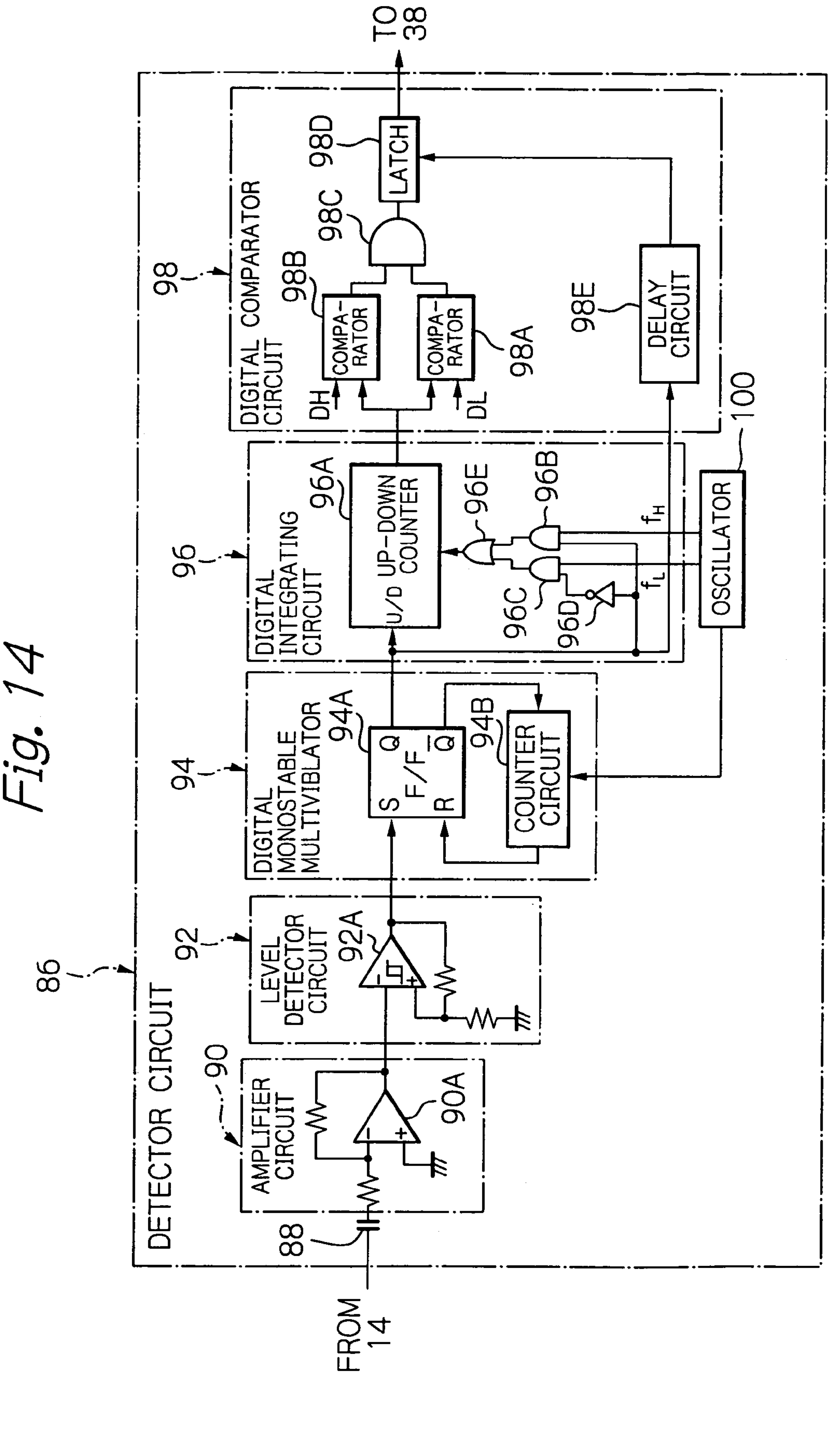
FIG. 14 is a circuit diagram of a detector circuit, used in a second embodiment of the broadcasting satellite converter according to the present invention, which is substituted for the prior art detector circuit shown in FIG. 1.

Similar to the above-mentioned first embodiment, when this second embodiment of the BS converter according to the present invention is illustrated in a block diagram, it is substantially identical to the block diagram shown in FIG. 1, except that a detector circuit, generally indicated by reference 86 in FIG. 14, is substituted for the detector circuit 36 shown in FIG. 2.

As shown in FIG. 14, the detector circuit 86 includes a capacitor 88, an amplifier circuit 90, a level detector circuit 92, a digital monostable multivibrator circuit 94, a digital integrating circuit 96, a digital comparator circuit 98, and an oscillator 100.

Similar to the capacitor 54 of the detector circuit 52 shown in FIG. 4, the capacitor 88 prevents the inputting of the power supply voltage signal (13 volts or 18 volts) to the detector circuit 86. Also, similar to the amplifier circuit 56 of the detector circuit 52 shown in FIG. 4, the amplifier circuit 90 includes an amplifier 90A, and resistors associated with the amplifier 90A. Namely, both the capacitor 88 and the amplifier circuit 90 form a high pass filter, so that a high frequency signal is allowed to be input to the level detector circuit 92.

Note, such a high frequency signal may be the band switching pulse signal superimposed on the power supply voltage signal or a spike noise superimposed on the power supply voltage signal.

Similar to the level detector circuit 58 of the detector circuit 52 shown in FIG. 4, the level detector circuit 92 includes a comparator 92A featuring a hysteresis characteristic, and resistors associated with the comparator 92A. The level detector circuit 92 removes noises from the high frequency signal, and wave-shapes the high frequency signal output from the amplifier circuit 90.

The digital monostable multivibrator circuit 94 includes a flip-flop 94A, and a counter circuit 94B connected to the flip-flop 94A as shown in FIG. 14. The counter circuit 94B is connected to the oscillator 100 so that a series of clock pulses having a high frequency is input from the oscillator 100 to the counter circuit 94B.

Whenever a pulse is input from the level detector circuit 92 to the flip-flop 92A, an enable signal is output from the flip-flop 92A to the counter circuit 94B. When the enable signal is input to the counter circuit 94B, it starts to count the clock pulses output from the oscillator 100. When a count number of the counter circuit 94B has reached a value which is previously set therein, it outputs a carrier signal as a reset signal to the flip-flop 94A. In short, whenever the pulse is input from the level detector circuit 92 to the flip-flop 94A, it outputs a pulse signal having a given constant pulse width to the digital integrating circuit 96.

The digital integrating circuit 96 includes an up-down counter 96A, a first AND-gate 96B, a second AND-gate 96C, an inverter 96D and an OR-gate 96E, and these elements are arranged as shown in FIG. 14. The oscillator 100 outputs a series of high frequency clock pulses ($f_H$) and a series of low frequency clock pulses ($f_L$) to the respective first and second AND-gates 96B and 96C. An output of the flip-flop 64A is input to the first AND-gate 96B and the inverter 96D, and an output of the inverter 96D is input to the second AND-gate 96C.

While a pulse is output from the flip-flop 94A of the digital monostable multivibrator 94, i.e. while an output of the flip-flop 94A is at a high level, the high frequency clock pulses ($f_H$) are input from the oscillator 100 to the up-down counter 96A through the first AND-gate 96B and the OR-gate 96E, so that the up-down counter 96A counts the high frequency clock pulses ($f_H$).

Then, when the output of the flip-flop 94A is changed from the high level to a low level, i.e. when the outputting of the pulse from the flip-flop 94A ends, the low frequency clock pulses ($f_L$) are input from the oscillator 100 to the up-down counter 96A through the second AND-gate 96C and the OR-gate 96E, so that a count number of the up-down counter 96A is counted down in accordance with the low frequency clock pulses ($f_L$). When a pulse is again output from the flip-flop circuit 94A, the count-down of the count number of the up-down counter 96A ends, and then the count number of the up-down counter 96A is again counted up in accordance with the high frequency clock pulses ($f_H$). In short, the pulses output from the flip-flop 94A are digitally integrated by the up-down counter 96A. The count number of the up-down counter 96A is output as digital count number data to the digital comparator circuit 98. Namely, the digital monostable multivibrator 94 and the digital integrating circuit 96 form a digital converting circuit for converting the frequency of the band switching pulse signal (22±4 kHz) into a digital integrated value (count number data).

The digital comparator circuit 98 is constituted as a window-type comparator circuit including a first digital comparator 98A featuring low reference number data (DL), a second digital comparator 98B featuring a high reference number data (DH), an AND-gate 98C connected to both output terminal of the first and second digital comparators 98A and 98B, and a latch circuit 98D connected to an output terminal of the AND-gate 98C. In this digital comparator circuit 98, the digital count number data output from the up-down counter 96A is compared with the low reference number data (DL) and the high reference number data (DH), whereby it is determined whether the digital count number data derives from the band switching pulse signal (22±4 kHz), as stated in detail hereinafter.

Note, in this second embodiment, the BS converter 10 includes a controller (not shown), by which the respective low and high reference number data (DH) and (DH) are set in the first and second digital comparators 98A and 98B.

Also, the digital comparator circuit 98 includes a delay circuit 98E which produces a latch timing signal based on the series of pulses output from the flip-flop 94A. When the latch timing signal is output from the delay circuit 98E to the latch circuit 98D, the latch circuit 98D latches one bit datum output from the AND-gate 98C. Note, the latch circuit 98D may be formed as a D-type flip-flop. Also, note, the delay circuit 98E may be constituted as shown in either FIG. 8 or FIG. 12.

Next, with reference to timing charts of FIGS. 15A, 15B, 15C, 15D and 15E, timing charts of FIGS. 16A, 16B, 16C, 16D and 16E, and timing charts of FIGS. 17A, 17B, 17C, 17D and 17E, an operation of the detector circuit 86 will be now explained below.

For example, when the band switching pulse signal having the frequency of 22±4 kHz is superimposed on the power supply voltage signal (13 volts or 18 volts) in the BS tuner 14 by tuning the television set to a channel to receive a BS signal included in the high frequency band of 11.7 GHz to 12.75 GHz, the band switching pulse signal is input to the amplifier circuit 90 through the capacitor 88. Namely, the band switching pulse signal is amplified to a given voltage level by the amplifier 90A, and the amplified band switching pulse signal is input to the level detector circuit 92.

In the level detector circuit 92, the amplified band switching pulse signal is compared with a predetermined threshold voltage by the comparator 92A. Since the threshold voltage is previously set so as to be lower than a peak voltage of the amplified band switching pulse signal, a pulse signal, having substantially the same frequency as that (22±4 kHz) of the band switching pulse signal, is output from the level detector circuit 92, as shown in the timing chart of FIG. 15A. Thus, although the pulse signal, which is output from the level detector circuit 92, may be referred to as a band switching pulse signal, this band switching pulse signal is free from the various noises involved in the original band switching pulse signal, due to the hysteresis characteristic of the comparator 92A. In short, the band switching pulse signal is wave-shaped by the comparator 98A, and the wave-shaped band switching pulse signal is input to the flip-flop 94A of the digital monostable multivibrator 94.

Figures 15A, 15B, 15C, 15D, 15E:
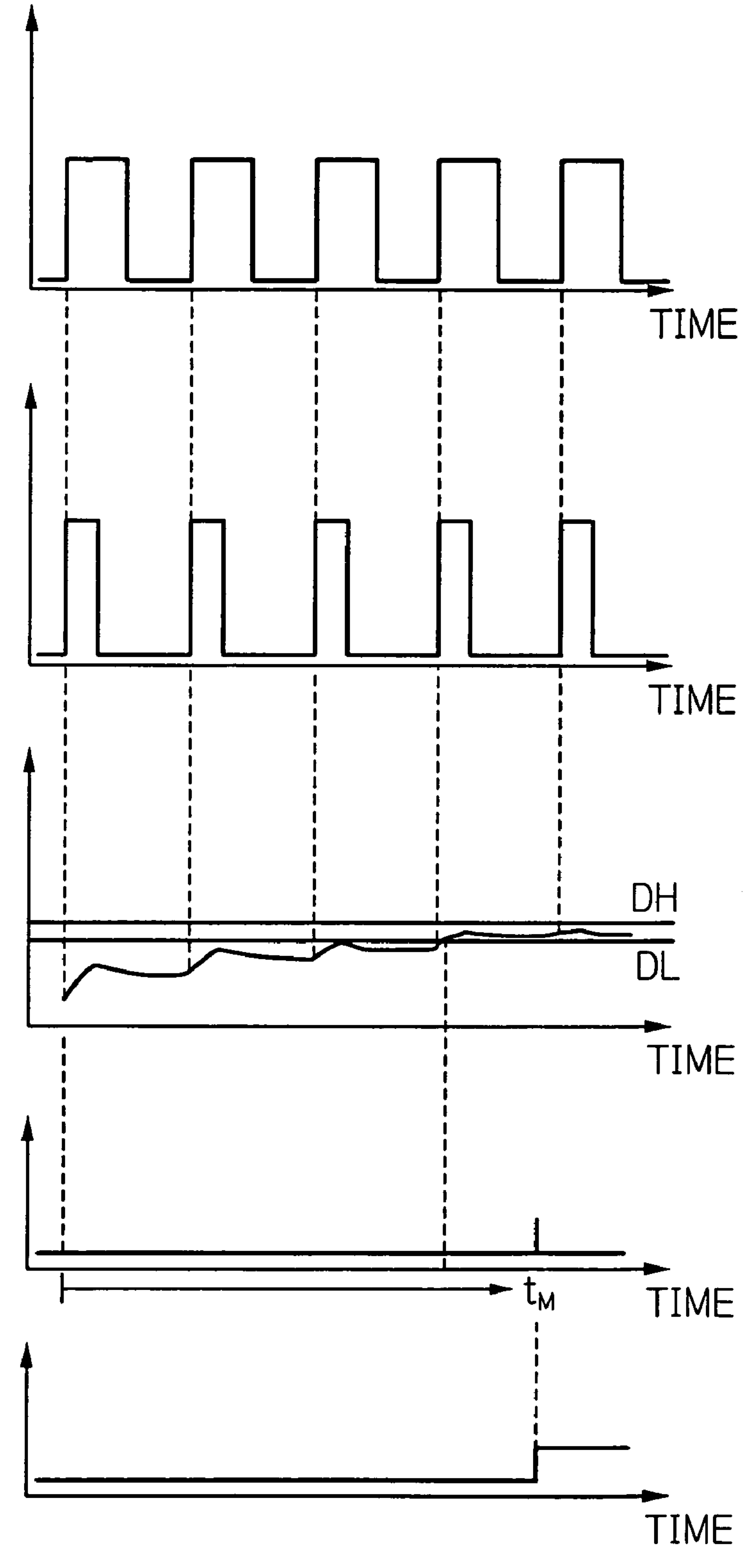
FIG. 15A is a timing chart to explain an operation of a level detector circuit shown in FIG. 14, when a band switching pulse signal is superimposed on a power supply voltage signal.
FIG. 15B is a timing chart to explain an operation of a digital monostable multivibrator shown in FIG. 14, when the band switching pulse signal is superimposed on the power supply voltage signal.
FIG. 15C is a timing chart to explain an operation of a digital integrating circuit shown in FIG. 14, when the band switching pulse signal is superimposed on the power supply voltage signal.
FIG. 15D is a timing chart to explain an operation of a delay circuit of a digital comparator circuit shown in FIG. 14, when the band switching pulse signal is superimposed on the power supply voltage signal.
FIG. 15E is a timing chart to explain an operation of a latch circuit of the digital comparator circuit shown in FIG. 14, when the band switching pulse signal is superimposed on the power supply voltage signal.

Note, as is apparent from the timing chart of FIG. 15A, the wave-shaped band switching pulse signal (22±4 kHz), which is output from the level detector circuit 92, may feature a duty factor of approximately 50%.

As already explained above, while the wave-shaped band switching pulse signal (22±4 kHz) is input from the level detector circuit 92 to the flip-flop 94A of the digital monostable multivibrator 94, the flip-flop 94A produces a series of pulses having a given constant pulse width and a duty factor of less than 50%, as shown in the timing chart of FIG. 15B. Preferably, the pulse width of the pulses, which are output from the flip-flop 94A, is less than half of a cycle of the wave-shaped band switching pulse signal output from the level detector circuit 92, but the pulse width concerned may be somewhat more than half of the cycle of the wave-shaped band switching pulse signal, if necessary. In any event, as is apparent from the timing chart of FIG. 15B, the duty factor of the pulses, which are output from the flip-flop 94A, is made smaller than that (approximately 50%) of the wave-shaped band switching pulse signal.

Similar to the above-mentioned first embodiment, in this second embodiment, although the intermediate frequency signals BS-IF are input together with the band switching pulse signal (22±4 kHz) to the amplifier circuit 90, they cannot be detected by the level detector circuit 92, because of very small amplitudes of the intermediate frequency signals BS-IF.

The pulses, which are output from the flip-flop 94A, are input to the up-down counter 96A of the digital integrating circuit 96, in which the pulses are digitally integrated to thereby produce count number data based on the duty factor of the pulses concerned, and the count number data is gradually increased, as shown in the timing chart of FIG. 15C. In particular, the high frequency clock pulses ($f_H$) have a frequency which is M times that of the low frequency clock pulses ($f_L$), and "M" is selected such that the count number data reaches a value falling within the range between the low reference number data (DL) and the high reference number data (DH) when the pulses, which are output from the flip-flop 94A, are derived from the band switching pulse signal having the frequency of 22±4 kHz ("M" is a positive integer of more than one). In short, "M" is previously determined such that the count number data becomes steady at a value falling within the range between the low reference number data (DL) and the high reference number data (DH).

The count number data is always output from the up-down counter 96A to both the first and second digital comparators 98A and 98B of the window-type digital comparator circuit 98. When the count number data is smaller than the low reference number data (DL), the first digital comparator 98A outputs a low level signal to the AND-gate 98C, and the second digital comparator 64B outputs a high level signal to the AND-gate 98C. When the count number data exceeds the low reference number data (DL), i.e. when the count number data becomes steady at the value falling within the range between the low reference number data (DL) and the high reference number data (DH), the low level signal, which is output from the first digital comparator 98A to the AND-gate 98C, is changed to a high level signal.

In short, while the band switching pulse signal (22±4 kHz) is superimposed on the power supply voltage signal (13 volts or 18 volts), both the first and second digital comparators 98A and 98B output the high level signals to the AND-gate 98C, and thus the AND-gate 98C outputs a high level signal to the latch circuit 98D.

On the other hand, the pulses, which are output from the flip-flop 94A, are input to the delay circuit 98E, in which a latch timing signal is produced based on the pulses output from the flip-flop 94A. The delay circuit 98E is constituted so as to produce and output a latch timing signal at a predetermined time point $t_M$ measured from a time point at which the inputting of the pulses from the flip-flop 94A to the delay circuit 98E is commenced, as shown in the timing chart of FIG. 15D. Note, as is apparent from this timing chart, at the time point $t_M$, the count number data has reached the value falling within the range between the low reference number data (DL) and the high reference number data (DH).

When the latch timing signal is input from the delay circuit 98E to the latch circuit 98D, the high level signal, which is output from the AND-circuit 98C is latched in the latch circuit 98D, so that the high level signal is output from the latch circuit 98D to the selector circuit 38 (FIG. 1), as shown in the timing chart of FIG. 15E.

Thus, similar to the above-mentioned prior art BS converter shown in FIG. 1, when the television set, connected to the BS tuner 14, is tuned to a channel to receive a BS signal included in the high frequency band of 11.7 GHz to 12.75 GHz, i.e. when the band switching pulse signal is superimposed on the power supply voltage signal (13 volts or 18 volts) in the BS tuner 14, the first drive control signal, which is output from the selector circuit 38 to the first local frequency oscillator 32L, is changed from the high level to the low level so that the driving of the first local frequency oscillator 32L is stopped. On the other hand, the second drive control signal, which is output from the selector circuit 38 to the second local frequency oscillator 32H, is changed from the low level to a high level so that the second local frequency oscillator 32H is driven.

In short, while the band switching pulse signal (22±4 kHz) is superimposed on the power supply voltage signal (13 volts or 18 volts), only the second local frequency oscillator 32H is driven so that the BS signals, included in the high frequency band of 11.7 GHz to 12,75 GHz, are converted into the intermediate frequency signals BS-IF.

While the band switching pulse signal is not superimposed on the power supply voltage signal (13 volts or 18 volts) in the BS tuner 14, i.e. while the television set is tuned to a channel to receive a BS signal included in the low frequency band of 10.7 GHz to 11.7, a low frequency spike noise having a lower frequency than that (22±4 kHz) of the band switching pulse signal may be superimposed on the power supply voltage signal.

In this case, the low frequency spike noise is input to the amplifier circuit 90 through the capacitor 88. Namely, the low frequency spike noise is amplified to a given voltage level by the amplifier 90A, and the amplified low frequency spike noise is input to the level detector circuit 92, in which the amplified low frequency spike noise is compared with the predetermined threshold voltage by the comparator 92A. If the threshold voltage is lower than a peak voltage of the amplified low frequency spike noise, a pulse spike noise, having substantially the same frequency as that of the low frequency spike noise, is output from the level detector circuit 92, as shown in the timing chart of FIG. 16A. Namely, the low frequency spike noise is wave-shaped by the comparator 92A, and the wave-shaped low frequency spike noise is input to the flip-flop 94A of the digital monostable multivibrator 94.

Figure 16A:
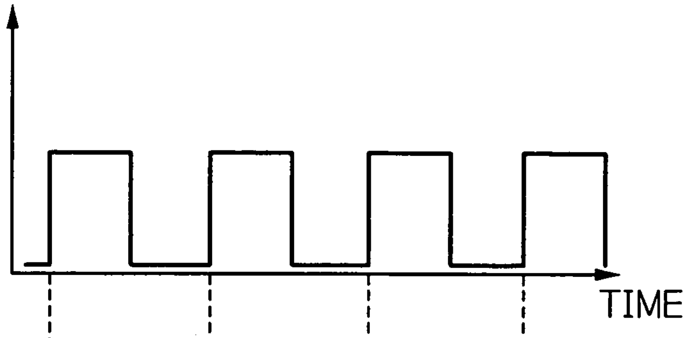
FIG. 16A is a timing chart to explain an operation of the level detector circuit shown in FIG. 14, when a low frequency spike noise having a frequency lower than that of the band switching pulse signal is superimposed on the power supply voltage signal.

Note, as is apparent from the timing chart of FIG. 16A, the wave-shaped low frequency spike noise, which is output from the level detector circuit 92, may feature a duty factor of approximately 50%.

Figure 16B:
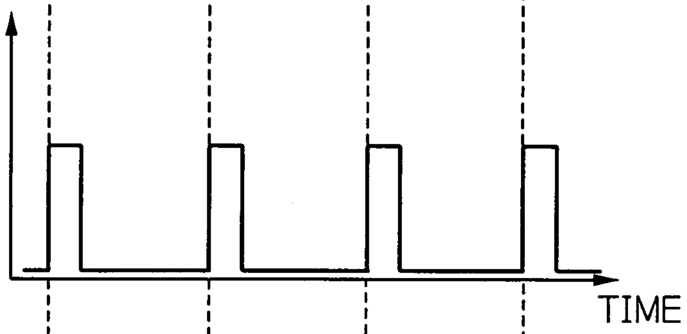
FIG. 16B is a timing chart to explain an operation of the digital monostable multivibrator shown in FIG. 14, when the low frequency spike noise is superimposed on the power supply voltage signal.

As already explained above, while the wave-shaped low frequency spike noise is input from the level detector circuit 92 to the flip-flop 94A of the digital monostable multivibrator 94, the flip-flop 94A produces a series of pulses having a given constant pulse width and a duty factor of less than 50%, as shown in the timing chart of FIG. 16B. As is apparent from this timing chart, the duty factor of the pulses, which are output from the flip-flop 94A, is made smaller than that (approximately 50%) of the low frequency spike noise.

Note, the pulse width of the noise pulses, which are output from the flip-flop 94A, is substantially the same as that of the pulses which are derived from the aforesaid wave-shaped band switching pulse signal (FIG. 15B), but the noise pulses have a smaller duty factor than that of the pulses which are derived from the aforesaid wave-shaped band switching pulse signal (FIG. 15B), due to the fact that the low frequency spike noise has the lower frequency than that (22±4 kHz) of the band switching pulse signal.

Figure 16C:
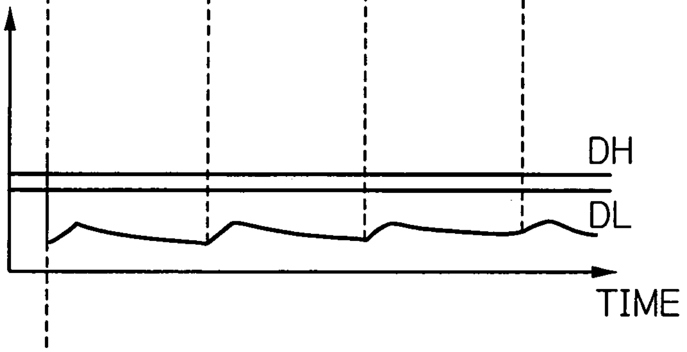
FIG. 16C is a timing chart to explain an operation of the digital integrating circuit shown in FIG. 14, when the low frequency spike noise is superimposed on the power supply voltage signal.

The noise pulses, which are output from the flip-flop 94A, are input to the up-down counter 96A of the digital integrating circuit 96, in which the noise pulses are digitally integrated to thereby produce count number data based on the duty factor of the noise pulses, and the count number data becomes steady without exceeding the low reference number data (DL), as shown in the timing chart of FIG. 16C, because the low frequency spike noise having the lower frequency than that (22±4 kHz) of the band switching pulse signal.

The count number data is always output from the up-down counter 96A to both the first and second digital 30 comparators 98A and 98B of the window-type digital comparator circuit 98. Since the count number data has a value which is smaller than the low reference number data (DL), the first digital comparator 98A outputs a low level signal to the AND-gate 98C, and the second digital comparator 98B outputs a high level signal to the AND-gate 98C.

In short, while the low frequency spike noise is superimposed on the power supply voltage signal (13 volts or 18 volts), the first and second digital comparators 98A and 98B output the low and high level signals to the AND-gate 98C, and thus the AND-gate 98C outputs a low level signal to the latch circuit 98D.

Figure 16D:
FIG. 16D is a timing chart to explain an operation of the delay circuit of the digital comparator circuit shown in FIG. 14, when the low frequency spike noise is superimposed on the power supply voltage signal.

On the other hand, the noise pulses, which are output from the flip-flop 94A, are input to the delay circuit 98E, in which a latch timing signal is produced based on the noise pulses output from the flip-flop 94A at a time point $t_L$ measured from a time point at which the inputting of the noise pulses from the flip-flop 94A to the delay circuit 98E is commenced, as shown in the timing chart of FIG. 16D. Note, the time point $t_L$ becomes later than the time point $t_M$ (FIG. 15D) for substantially the same reasons as explained in the above-mentioned first embodiment.

Figure 16E:
FIG. 16E is a timing chart to explain an operation of the AND-gate of the digital comparator circuit shown in FIG. 14, when the low frequency spike noise is superimposed on the power supply voltage signal.

When the latch timing signal is input from the delay circuit 98E to the latch circuit 98D, the low level signal, which is output from the AND-gate 98C, is latched in the latch circuit 98D, so that the signal, which is output from the latch circuit 98D to the selector circuit 38 (FIG. 1) is maintained at the low level, as shown in the timing chart of FIG. 16E.

In short, although the low frequency spike noise having the lower frequency than that (22±4 kHz) of the band switching pulse signal is superimposed on the power supply voltage signal (13 volts or 18 volts), the detector circuit 86 does not recognize the low frequency spike noise as the band switching signal.

Also, while the band switching pulse signal is not superimposed on the power supply voltage signal (13 volts or 18 volts) in the BS tuner 14, i.e. while the television set is tuned to a channel to receive a BS signal included in the low frequency band of 10.7 GHz to 11.7, a high frequency spike noise having a higher frequency than that (22±4 kHz) of the band switching pulse signal may be superimposed on the power supply voltage signal.

In this case, the high frequency spike noise is input to the amplifier circuit 90 through the capacitor 88. Namely, the high frequency spike noise is amplified to a given voltage level by the amplifier 90A, and the amplified high frequency spike noise is input to the level detector circuit 92, in which the amplified high frequency spike noise is compared with the predetermined threshold voltage by the comparator 92A. If the threshold voltage is lower than a peak voltage of the amplified high frequency spike noise, a pulse spike noise, having substantially the same frequency as that of the high frequency spike noise, is output from the level detector circuit 92, as shown in the timing chart of FIG. 17A. Namely, the high frequency spike noise is wave-shaped by the comparator 92A, and the wave-shaped high frequency spike noise is input to the flip-flop 94A of the digital monostable multivibrator 94.

Figure 17A:
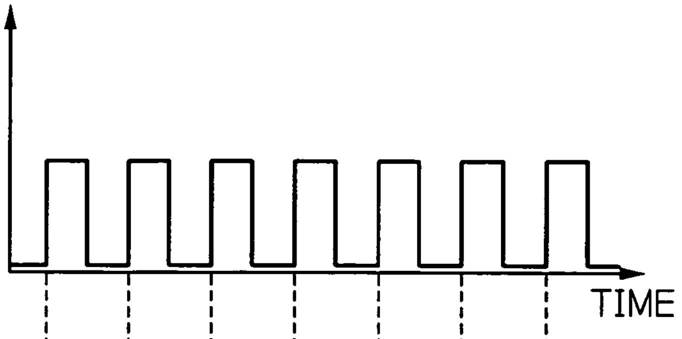
FIG. 17A is a timing chart to explain an operation of the level detector circuit shown in FIG. 14, when a high frequency spike noise having a frequency higher than that of the band switching pulse signal is superimposed on the power supply voltage signal.

Note, as is apparent from the timing chart of FIG. 17A, the wave-shaped high frequency spike noise, which is output from the level detector circuit 92, may feature a duty factor of approximately 50%.

Figure 17B:
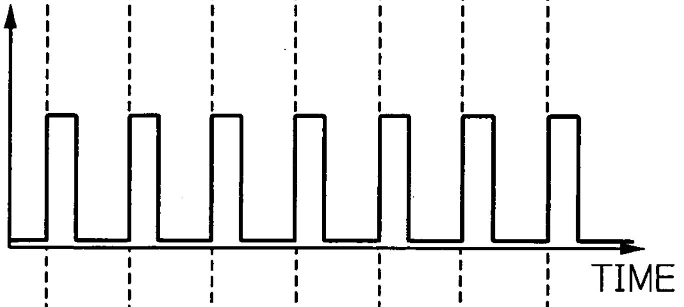
FIG. 17B is a timing chart to explain an operation of the digital monostable multivibrator shown in FIG. 14, when the high frequency spike noise is superimposed on the power supply voltage signal.

As already explained above, while the wave-shaped high frequency spike noise is input from the level detector circuit 92 to the flip-flop 94A of the digital monostable multivibrator 94, the flip-flop 94A produces a series of pulses having a given constant pulse width and a duty factor of less than 50%, as shown in the timing chart of FIG. 17B. As is apparent from the this timing chart, the duty factor of the pulses, which are output from the flip-flop 94A, is made smaller than that (approximately 50%) of the high frequency spike noise.

Note, the pulse width of the noise pulses, which are output from the flip-flop 94A, is substantially the same as that of the pulses which are derived from the aforesaid wave-shaped band switching pulse signal (FIG. 15B), but the noise pulses have a larger duty factor than that of the pulses which are derived from the aforesaid wave-shaped band switching pulse signal (FIG. 15B), due to the fact that the high frequency spike noise having the higher frequency than that (22±4 kHz) of the band switching pulse signal.

Figure 17C:
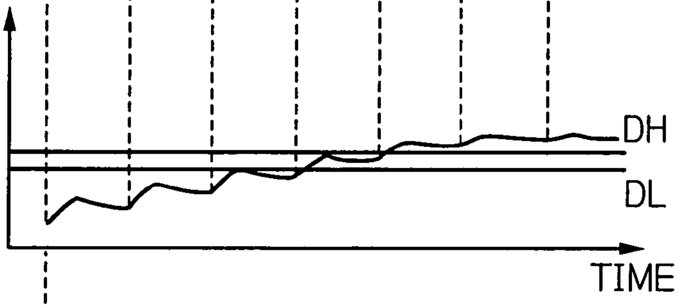
FIG. 17C is a timing chart to explain an operation of the digital integrating circuit shown in FIG. 14, when the high frequency spike noise is superimposed on the power supply voltage signal.

The noise pulses, which are output from the flip-flop 94A, are input to the up-down counter 96A of the digital integrating circuit 96, in which the noise pulses are digitally integrated to thereby produce count number data based on the duty factor of the noise pulses, and the count number data becomes steady at a value exceeding the high reference number data (DH), as shown in the timing chart of FIG. 17C, because the high frequency spike noise having the higher frequency than that (22±4 kHz) of the band switching pulse signal.

The count number data is always output from the up-down counter 96A to both the first and second digital comparators 98A and 98B of the window-type digital comparator circuit 98. Since the count number data has a value which is larger than the high reference number data (DH), the first digital comparator 98A outputs a high level signal to the AND-gate 98C, and the second digital comparator 98B outputs a low level signal to the AND-gate 98C.

In short, while the high frequency spike noise is superimposed on the power supply voltage signal (13 volts or 18 volts), the first and second digital comparators 98A and 98B output the high and low level signals to the AND-gate 98C, and thus the AND-gate 98C outputs a low level signal to the latch circuit 98D.

Figure 17D:
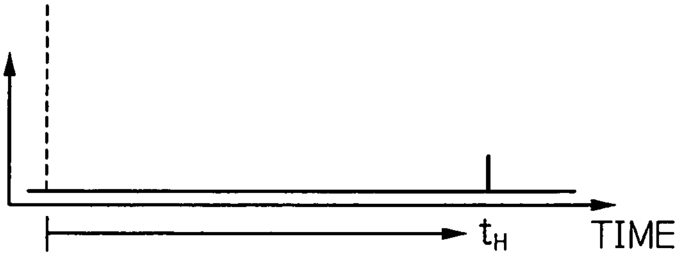
FIG. 17D is a timing chart to explain an operation of the delay circuit of the digital comparator circuit shown in FIG. 14, when the high frequency spike noise is superimposed on the power supply voltage signal.

On the other hand, the noise pulses, which are output from the flip-flop 94A, are input to the delay circuit 98E, in which a latch timing signal is produced based on the noise pulses output from the flip-flop 94A at a time point $t_H$ measured from a time point at which the inputting of the noise pulses from the flip-flop 94A to the delay circuit 98E is commenced, as shown in the timing chart of FIG. 17D. Note, the time point $t_H$ becomes earlier than the time point tm (FIG. 15D) for substantially the same reasons as explained in the above-mentioned first embodiment.

Figure 17E:
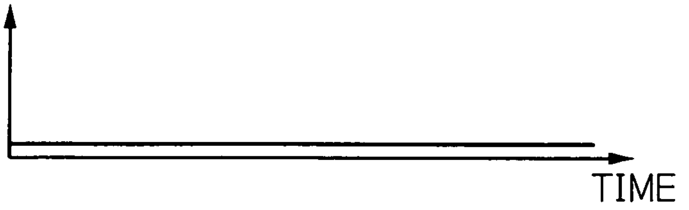
FIG. 17E is a timing chart to explain an operation of the AND-gate of the digital comparator circuit shown in FIG. 14, when the high frequency spike noise is superimposed on the power supply voltage signal.

When the latch timing signal is input from the delay circuit 98E to the latch circuit 98D, the low level signal, which is output from the AND-gate 98C, is latched in the latch circuit 98D, so that the signal, which is output from the latch circuit 98D to the selector circuit 38 (FIG. 1) is maintained at the low level, as shown in the timing chart of FIG. 17E.

In short, although the high frequency spike noise having the higher frequency than that (22±4 kHz) of the band switching pulse signal is superimposed on the power supply voltage signal (13 volts or 18 volts), the detector circuit 86 does not recognize the high frequency spike noise as the band switching signal.

In the above-mentioned embodiments of the present invention, although the band switching pulse signal (22±4 kHz) is superimposed on the power supply voltage signal (13 volts or 18 volts), no influence can be exerted on the intermediate frequency signals BS-IF by the superimposed band switching pulse signal, because the frequency of the band switching pulse signal is sufficiently lower than that (950 to 2150 MHz) of the intermediate frequency signal BS-IF.

Finally, it will be understood by those skilled in the art that the foregoing description is of a preferred embodiment of the device, and that various changes and modifications may be made to the present invention without departing from the spirit and scope thereof.

The invention claimed is:

1. A switching circuit for a broadcasting satellite converter wherein two local oscillators having different oscillation frequencies are switched in accordance with whether a band switching pulse signal having a given frequency is superimposed on a power supply voltage transmitted from a broadcasting satellite tuner, said switching circuit comprising:

a monostable multivibrator circuit to which said power supply voltage is input from said broadcasting satellite tuner, and in which input pulses are converted into pulses having a given time width;

a first integrating circuit which integrates an output of said monostable multivibrator circuit to output a signal having a level corresponding to a duty factor of the output of said monostable multivibrator circuit;

a determining circuit having a delay circuit to which the output of said monostable multivibrator circuit is input, and determining whether an output of said first integrating circuit falls within a given range at a timing of an output of said delay circuit; and a driver circuit which drives a local oscillator having an oscillation frequency corresponding to an output of said determining circuit.

2. The switching circuit as set forth in claim 1, wherein said determining circuit includes first and second comparators which compare the output of said first integrating circuit with respective high and low limit reference voltages of said given range, first and second latch circuits which latch and output respective outputs of said first and second comparators at the timing of the output of said delay circuit, and a logic circuit which outputs a binary signal in accordance with whether the output of said first integrating circuit falls within said given range.

3. The switching circuit as set forth in claim 1, wherein said determining circuit includes a comparator featuring a window-type comparison characteristic, to which the output of said first integrating circuit is input, and a latch circuit which latches and outputs an output of said comparator at the timing of the output of said delay circuit.

4. The switching circuit as set forth in claim 1, further comprising a high pass filter circuit to which said power supply voltage is input, and a level detector which detects an output of said high pass filter circuit at a given level, said monostable multivibrator being triggered with an output of said level detector.

5. The switching circuit as set forth in claim 4, wherein said level detector comprises a switching circuit featuring a hysteresis characteristic.

6. The switching circuit as set forth in claim 1, wherein said delay circuit includes a second integrating circuit which integrates the output of said monostable multivibrator circuit, a level detector which detects an output of said second integrating circuit at a specific level, a differentiating circuit which differentiates an output of said level detector, and a rectifier circuit which all-wave-rectifies an output of said differentiating circuit.

7. The switching circuit as set forth in claim 1, wherein said first integrating circuit comprises an up/down counter for counting a clock signal.

* * * * *